US011200527B2

(12) United States Patent
Kaulgud et al.

(10) Patent No.: US 11,200,527 B2
(45) Date of Patent: Dec. 14, 2021

(54) PLATFORM FOR EVALUATING AND RECOMMENDING PROCESS AUTOMATIONS

(71) Applicant: Accenture Global Solutions Limited, Dublin (IE)

(72) Inventors: Vikrant S. Kaulgud, Pune (IN); Vibhu Saujanya Sharma, Bangalore (IN); Poulami Debnath, Bangalore (IN); Milind Savagaonkar, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 462 days.

(21) Appl. No.: 15/977,876

(22) Filed: May 11, 2018

(65) Prior Publication Data

US 2019/0347586 A1 Nov. 14, 2019

(51) Int. Cl.
*G06Q 10/06* (2012.01)

(52) U.S. Cl.
CPC ....... *G06Q 10/0633* (2013.01); *G06Q 10/067* (2013.01); *G06Q 10/0637* (2013.01); *G06Q 10/06393* (2013.01)

(58) Field of Classification Search
None
See application file for complete search history.

(56) References Cited

U.S. PATENT DOCUMENTS

| | | | | |
|---|---|---|---|---|
| 5,915,250 A | * | 6/1999 | Jain | G06F 16/58 |
| 2007/0083385 A1 | * | 4/2007 | Patterson | G06Q 10/06395 |
| | | | | 705/2 |
| 2008/0027841 A1 | * | 1/2008 | Eder | G06Q 40/00 |
| | | | | 705/35 |
| 2009/0138425 A1 | * | 5/2009 | Narayanaswamy | G06Q 10/06 |
| | | | | 706/48 |
| 2010/0082385 A1 | * | 4/2010 | Cao | G06Q 10/06393 |
| | | | | 705/7.39 |
| 2015/0178811 A1 | * | 6/2015 | Chen | G06Q 30/0631 |
| | | | | 705/26.7 |
| 2018/0060779 A1 | * | 3/2018 | Suri | G06Q 10/06316 |

* cited by examiner

*Primary Examiner* — Cory W Eskridge
(74) *Attorney, Agent, or Firm* — Harrity & Harrity, LLP

(57) ABSTRACT

A device may receive a process model and a reference process model. The process model may include a first plurality of nodes corresponding to a first plurality of stages of a particular process. The reference process model may include a second plurality of nodes corresponding to a second plurality of stages of a reference process. The device may map the process model to the reference process model, identify that a first stage corresponds to a second stage, determine a difference between a value, of a metric, associated with the first stage and a value, of the metric, associated with the second stage, cause an interactive user interface to display a visual representation of the difference, identify automation service(s) that compensate for the difference, determine a score for the process model, and cause the interactive user interface to display the score to enable selection of optimal automation service(s) to deploy.

20 Claims, 24 Drawing Sheets

FIG. 1K

| Map BPMs | Annotation Canvas | "Automability" Analysis | Trade-off Analysis |

Note: The project factors were assigned equal weights by default for initial AS-IS score calculations

| | |
|---|---|
| Cost per unit without automation | $C_C$ 25% |
| Cost of adopting automation | $C_A$ 25% |
| Cost of usage of automation | $C_U$ 25% |
| Business impact of not using automation | $C_{BI}$ 25% |

Note: Project factors for your project have been computed and assigned estimated weights. Please check the *Trade-Off Report*.

$C_C$ — 15%

$C_A$ — 35%

$C_U$ — 30%

$C_{BI}$ — 20%

*The project may adopt this automation*

Re-evaluate AS-IS Score

Note: Manually adjust the sliders and click to re-evaluate the AS-IS score

FIG. 1P

| Map BPMs | Annotation Canvas | "Automability" Analysis | Trade-off Analysis |

Re-evaluated AS-IS Scores

| Set No. | Stage of AS-IS Business Process Model | Recommendation on Automation Adoption for Stage | Re-evaluated AS-IS Score for Customer Process Model | |
|---|---|---|---|---|
| 01 | 3a, 3b, 3c | AI for AM | 0.9245 | View Recommendations |
|  | 4 | Splunk® | | |
| 02 | 3a, 3b, 3c | Splunk® | 0.3098 | View Recommendations |
|  | 4 | Splunk® | | |

Investment Recommendation
Enter total amount of investment: $1,000
Recommendation: Invest in *AI for AM*
Details:
Total Investment for *AI for AM*: $800
Total Investment for *Splunk*: $400
Higher Business Impact: *AI for AM*

Dependency Recommendation
The automation(s) selected in Set 01 have no dependency amongst them.
Please feel free to choose in any desired order.

Download automation dependency info

Finish

FIG. 1Q

| Stage 1: Support Engineer examines ticket (Automation under consideration = AI for AM) | Cost per unit without the automation ($C_C$) | Cost of adopting the automation ($C_A$) | Cost of using the automation ($C_U$) | Business impact of not using the automation ($C_{BI}$) |
|---|---|---|---|---|
| Percentages | 0.4 | 0.2 | 0.1 | 0.3 |
| Actual Cost Values | $S1_C$ | $S1_A$ | $S1_U$ | $S1_{BI}$ |
| Weighted Contribution | $W = 0.40 * S1_C$ | $X = 0.2 * S1_A$ | $Y = 0.10 * S1_U$ | $Z = 0.30 * S1_{BI}$ |
| Ratio of Contribution | $W/(W+X+Y+Z)$ | $X/(W+X+Y+Z)$ | $Y/(W+X+Y+Z)$ | $Z/(W+X+Y+Z)$ |

PLATFORM FOR EVALUATING AND RECOMMENDING PROCESS AUTOMATIONS

BACKGROUND

A business process model (BPM) is a model that conveys a high-level flow of end-to-end activities relating to the production of a product, the provision of a service, and/or the like.

SUMMARY

According to some possible implementations, a method may include receiving, by a device, a process model and a reference process model. The process model may represent a particular process that includes a first plurality of stages. The reference process model may represent a reference process that includes a second plurality of stages. The method may include processing, by the device, the process model and the reference process model to compare the process model and the reference process model, identifying, by the device, that a first stage of the first plurality of stages corresponds to a second stage of the second plurality of stages based on processing the process model and the reference process model, determining, by the device, a deviation between a value, of a metric, associated with the first stage and a value, of the metric, associated with the second stage based on identifying that the first stage corresponds to the second stage, causing, by the device, qualitative information relating to the deviation to be presented after determining the deviation, identifying, by the device, and after causing the qualitative information to be presented, one or more automation services that, when deployed in the particular process, at least partially address the deviation, determining, by the device, a score for the process model based on identifying the one or more automation services and based on a plurality of project factors relating to the one or more automation services, and causing, by the device, the score to be presented to enable selection of an optimal set of automation services to deploy in the particular process.

According to some possible implementations, a device may include one or more memories; and one or more processors, communicatively coupled to the one or more memories, to receive a process model and a reference process model. The process model may include a first plurality of nodes corresponding to a first plurality of stages of a particular process. The reference process model may include a second plurality of nodes corresponding to a second plurality of stages of a reference process. The one or more processors may map the process model to the reference process model by comparing the first plurality of nodes and the second plurality of nodes, identify that a first stage of the first plurality of stages corresponds to a second stage of the second plurality of stages based on mapping the process model to the reference process model, determine a difference between a value, of a metric, associated with the first stage and a value, of the metric, associated with the second stage based on identifying that the first stage corresponds to the second stage, cause an interactive user interface to display a visual representation relating to the difference after determining the difference, identify, after determining the difference, one or more automation services that, when deployed in the particular process, at least partially compensate for the difference, determine a score for the process model based on identifying the one or more automation services, and cause the interactive user interface to display the score to enable selection of an optimal set of automation services to deploy in the particular process.

According to some possible implementations, a non-transitory computer-readable medium may store instructions. The instructions may include one or more instructions that, when executed by one or more processors, cause the one or more processors to receive a process model and a reference process model. The process model may represent a particular process that includes a first plurality of stages. The reference process model may represent a reference process that includes a second plurality of stages. The instructions may include one or more instructions that, when executed by the one or more processors, cause the one or more processors to perform a comparison of the process model and the reference process model, identify that a first stage of the first plurality of stages corresponds to a second stage of the second plurality of stages based on performing the comparison, determine whether there is a deviation between a value, of a metric, associated with the first stage and a value, of the metric, associated with the second stage based on identifying that the first stage corresponds to the second stage, cause, based on determining that there is a deviation between the value associated with the first stage and the value associated with the second stage, qualitative information relating to the deviation to be presented, identify, after causing the qualitative information to be presented, one or more automation services that, when deployed in the particular process, at least partially compensate for the deviation, perform a score calculation, and a trade-off analysis, for the process model based on identifying the one or more automation services, and cause a result of the score calculation, and a report regarding the trade-off analysis, to be presented to enable selection of an optimal set of automation services for adoption by the particular process.

DETAILED DESCRIPTION

Figure 1A:
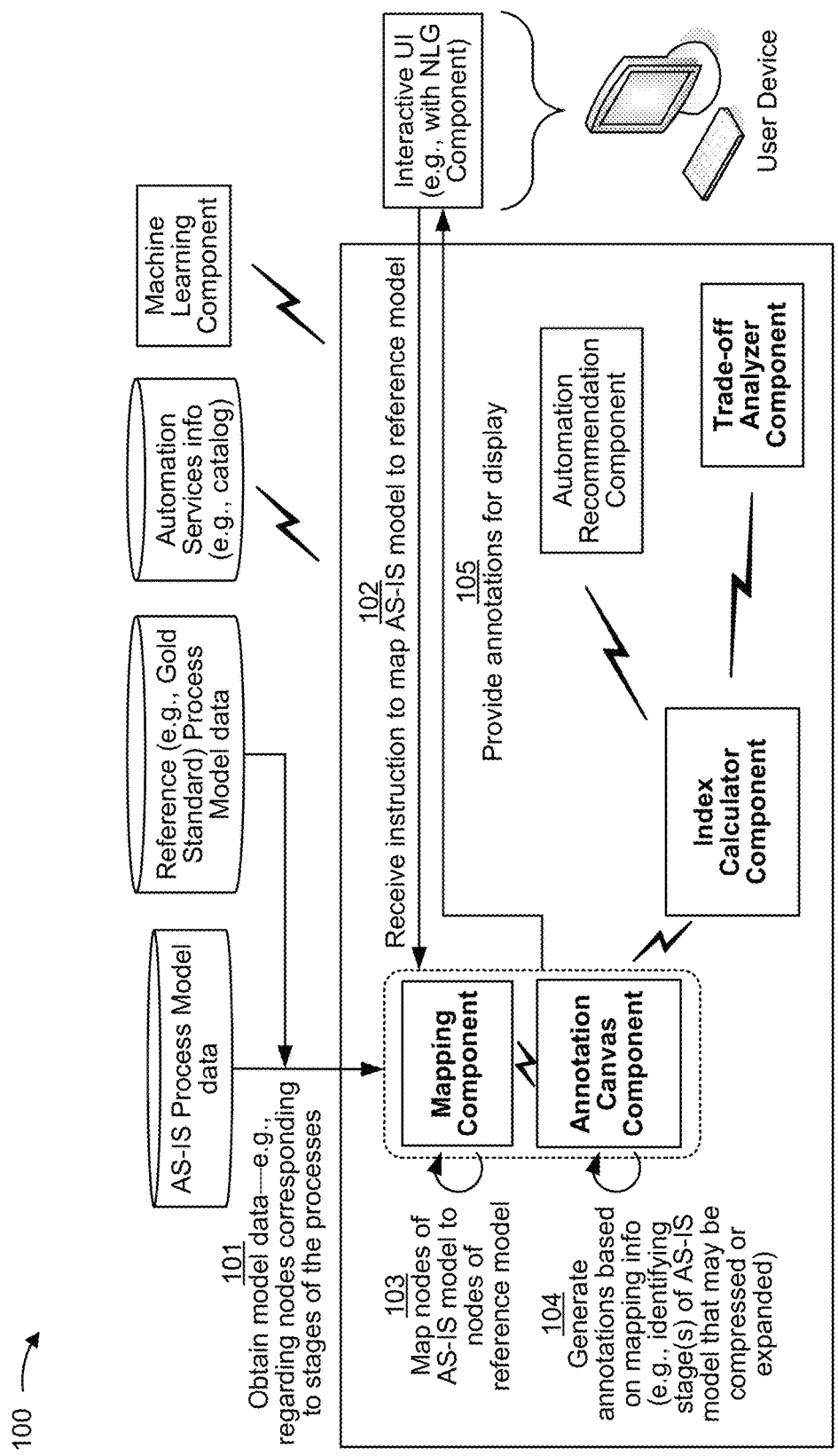
FIGS. 1A-1S are diagrams of an overview of an example implementation described herein.

The following detailed description of example implementations refers to the accompanying drawings. The same reference numbers in different drawings may identify the same or similar elements.

Enterprises, such as those that provide services relating to customer relationship management (CRM), enterprise resource planning (ERP), content management, software engineering, information technology (IT), and/or the like, are constantly seeking to improve operating efficiency and lower costs by automating business processes. However, selecting an automation service to adopt in a business process can be complex, time intensive, inefficient, and error prone. For example, many business processes include multiple stages with various execution constraints—e.g., some stages may be interdependent, some stages may need to be executed in parallel, and/or the like—which can make it difficult to manually identify automation services or solutions that operate within such constraints. This is especially so given the large, and ever-expanding, quantity of automation services that is available on the market. Furthermore, different projects operate in different environments, and have different cost considerations (some of which may have higher priority over others) that need to be taken into account when evaluating candidate automation services.

Some implementations, described herein, provide a platform (e.g., an "automability" engine or a device) that is capable of mapping a business process model (e.g., an "AS-IS" process model) to a reference process model (e.g., an industry standard model, such as an enterprise-specified "gold standard" model, associated with various metrics (e.g., key performance indicator (KPI) metrics)), and determining, based on the mapping, inefficiencies (e.g., gaps or deviations) in the business process model that might be addressed via automation. In some implementations, the platform is capable of automatically providing qualitative information that identifies (e.g., visually, such as via a color spectrum) how closely various stages of the business process model meet the reference process model (e.g., the KPI metrics), and identifying one or more relevant automation services that might address the inefficiencies. In some implementations, the platform is capable of calculating initial score(s) for the business process model, that provide a quantitative measure of the business process model relative to the reference process model, based on information regarding the automation service(s) under consideration, and based on the effects that such automation service(s) may have on certain factors for a current project (e.g., project factors, such as cost-related factors). In some implementations, the platform is capable of providing the initial score(s), and recommendations regarding the automation service(s), to a user (e.g., a business owner, a subject matter expert, and/or the like) for review, permitting the user to adjust weightings of the project factors as needed, and re-evaluating the score(s) based on the adjusted weightings. Further, in some implementations, the platform is capable of performing a trade-off analysis of the automation service(s) based on historical data regarding past automation service adoption decisions in prior projects, and generating and providing recommendations on whether the current project is likely to adopt the automation service(s) based on the trade-off analysis. Furthermore, in some implementations, the platform is capable of leveraging machine learning techniques, including similarity analysis and/or classification techniques, in various portions of the mapping and recommendation process.

In this way, a user can easily identify areas of a business process model that can be improved via automation, and receive recommendations on relevant automation service(s). By automating the identification of gaps between an AS-IS process model and a reference process model, the determination of one or more automation services that address such gaps, the scoring of the automation service(s) based on project factors, and the generation of trade-off reports that provide insight into whether the automation service(s) are likely to be adopted in a current project based on historical data on past automation service adoption decisions in prior project(s), the automation evaluation and recommendation platform ensures that a user is able to select an optimal set of automation service(s) to improve the AS-IS process. Enabling a user to select an optimal set of automation services for a business process, without having to manually evaluate a large repository of available automation services, and mine through large sets of past data on prior automation service-related decisions, conserves computing resources that will otherwise be expended as part of such activities. This also reduces or eliminates the possibility that a user will select an inefficient, or improper, automation service to deploy in a process. Furthermore, leveraging machine learning in the mapping and recommendation process improves the accuracy of model mapping, yields superior automation service recommendations, and conserves processor resources and/or storage resources that may otherwise be used to generate and store rules for model mapping and recommending automation services.

FIGS. 1A-1S are diagrams of an overview of an example implementation 100 described herein. As shown in FIG. 1A, example implementation 100 may include an automation evaluation and recommendation platform, a machine learning component, a user device, and various data sources, including an AS-IS process model data structure, a reference process model data structure, and an automation services data structure (e.g., catalog). One of more of the data structures may be implemented as a database, a graph, an array, a linked list, a table, a trie, and/or the like.

As shown in FIG. 1A, the automation evaluation and recommendation platform may include a mapping component, an annotation canvas component, an automation evaluation and recommendation index calculator component, an automation recommendation component, and a trade-off analyzer component. As further shown in FIG. 1A, the user device may include, or be communicatively coupled to, an interactive user interface (UI) associated with the automation evaluation and recommendation platform. In some implementations, the interactive UI may include a natural language generation (NLG) component.

In some implementations, the AS-IS process model data structure may store data associated with an AS-IS process model (e.g., a consumer's BPM). An AS-IS process model may include a graph having multiple nodes that each corresponds to a stage of an AS-IS process. The nodes may be associated with text-based labels, and may be coupled to one another via edges. The reference process model data structure may store data associated with a reference process model (e.g., a gold standard BPM). Similar to the AS-IS process model, the reference process model may include multiple nodes that each corresponds to a stage of a process, such as an industry standard business process.

The automation service data structure may store information relating to various automation services that are available to a business enterprise and accessible to a current project. In some implementations, the automation service data structure may include a graph data structure that stores the information as nodes. The information may indicate one or more automation domains, one or more automation purposes, one or more automation constraints, one or more automation levers, one or more automation services (with automation service identifiers stored as metadata), one or more nouns and/or verbs relating to the automation services, and/or the like. An automation domain may indicate a category that includes a particular type of automation service. An automation purpose may indicate a purpose with which one or more automation services may serve. An automation constraint may identify an issue associated with the automation purpose (e.g., an issue relating to quality, productivity, technology, etc.). An automation lever may indicate a solution to an automation purpose or to an automation constraint (e.g., a solution relating to productivity, a solution relating to quality, etc.). An automation service may be a system or a process for executing one or more tasks associated with a project, and may store an automation service identifier as metadata. A noun and/or a verb may describe properties or characteristics of an automation purpose, an automation lever, an automation constraint, an automation service, and/or the like.

In some implementations, the automation recommendation component may employ natural language processing and/or similarity analysis techniques to recommend one or more automation services (e.g., best-fit automation services). In some implementations, the automation recommendation component may, based on performing a similarity analysis (e.g., a lexical analysis technique, a semantic analysis technique, and/or the like) of input keywords (e.g., noun(s), verb(s), and/or the like), search the automation services data structure to identify one or more candidate automation services. Although not shown, in some implementations, example implementation 100 may include one or more automation application devices capable of deploying automation services.

As shown in FIG. 1A, and as shown by reference number 101, the mapping component may obtain, from the AS-IS process model data structure and the reference process model data structure, data relating to the AS-IS process model and the reference process model. For example, the mapping component may obtain node information, edge information, and/or the like relating to the AS-IS process model and the reference process model. In some implementations, the interactive UI may permit a user (e.g., a business owner, a subject matter expert, a process expert, and/or the like (which may all be the same person or different people)) to select the AS-IS process model and the reference process model for comparison or mapping purposes. In such cases, the mapping component may obtain the data based on selection(s) made by the user.

As shown by reference number 102, the mapping component may receive, from the interactive UI, an instruction to map the AS-IS process model to the reference process model. In some implementations, the interactive UI may permit a user to input a command to initiate the mapping process. Example interactive UIs are described below in connection with FIGS. 1K and 1L. As shown by reference number 103, the mapping component may map the AS-IS process model to the reference process model. In some implementations, the mapping component may compare the nodes of the AS-IS process model and the nodes of the reference process model to determine how closely the AS-IS process model is aligned with the reference process model. In some implementations, the mapping component may compare the nodes using an automated graph similarity matching technique. In some implementations, the mapping component may identify a sequence of the stages of the AS-IS process model relative to a sequence of the stages of the reference process model. Based on the comparison and the identification, the mapping component may determine whether each node in the AS-IS process model has a match in the reference process model.

In some implementations, the mapping component may, based on the comparison, identify nodes of the AS-IS process model in which corresponding stages of the AS-IS process may be compressed, or expanded, so as to align with the reference process model. For example, in a case where the mapping component determines that multiple nodes of the AS-IS process model correspond to a single node of the reference process model, the mapping component may identify that the multiple nodes of the AS-IS process model (or the corresponding stages of the AS-IS process) may be compressed. As another example, in a case where the mapping component determines that a single node of the AS-IS process model corresponds to multiple nodes of the reference process model, the mapping component may identify that the single node of the AS-IS process model (or the corresponding stage of the AS-IS process) may be expanded. An example mapping process is described below in connection with FIGS. 1F-1H.

As described above, the mapping component may determine the sequence of stages of each of the AS-IS process and the reference process during the mapping process. In some implementations, if the mapping component identifies a match (e.g., an accurate or exact match) of a node of the AS-IS process model to a node of the reference process model, the mapping component may store information regarding the match in a data structure—e.g., a repository. For example, the mapping component may store, and maintain, information regarding consecutive pairs of nodes (corresponding to consecutive stage pairs) of various AS-IS process models.

TABLE 1

Sample repository containing consecutive stage pair information.

| Stage$_f$ | Stage$_{f+1}$ | Count | Accessed # of Days Ago |
|---|---|---|---|
| Ticket Analysis by Support Engineer | Duplicate Ticket Identification | 20 | 6 |
| . . . | . . . | . . . | . . . |

As shown in Table 1, a repository may include an entry containing a label name "Ticket Analysis by Support Engineer" corresponding to a stage f of a particular AS-IS process model, a label name "Duplicate Ticket Identification" corresponding to a stage f+1 of the particular AS-IS process, a count value identifying a quantity of times that the consecutive stage pair has been incorporated in a business process model (e.g., any business process model throughout a business enterprise) (e.g., where a higher count value may result in the consecutive stage pair being identified as a match during a current mapping process), a quantity of days ago that the consecutive stage pair was last accessed (e.g., which can indicate a frequency of use of the sequential stages), and/or the like.

In some implementations, the mapping component may include, or utilize, the machine learning component to determine matches during the mapping process. In some implementations, in a case where an accurate match of a node of the AS-IS process model is not found, the mapping component may perform a similarity analysis (e.g., a cosine similarity analysis) of the label name of the node and label names stored in the repository. In a case where a match is found based on the similarity analysis, the mapping component may calculate a score using a classification technique. For example, the mapping component may utilize a logistic regression classification technique to calculate a score, where a dependent variable may include whether a mapping is valid (e.g., "1") or invalid (e.g., "0"), and where independent variables may include the above-described count value and the value of the quantity of days ago that a consecutive stage pair was last accessed. Here, in a case where the mapping component determines a score that satisfies a threshold (e.g., is greater than or equal to 0.5 and/or the like), mapping of the node may be confirmed.

In situations where a quantity of nodes, of the AS-IS process model in which no matches to nodes of the reference process model are found, satisfies a threshold (e.g., is less than 50% of all the nodes of the AS-IS process model), the mapping component may identify possible match options in the repository, and cause one or more of such possible match options to be presented to a user (e.g., via the interactive UI) for selection. In situations where the quantity of nodes, of the AS-IS process model in which no matches are found, does not satisfy the threshold (e.g., is greater than or equal to 50% of all the nodes of the AS-IS process model), the mapping component may cause a notification to be presented to the user (e.g., via the interactive UI) to indicate that the AS-IS process model is not consistent, or not aligned, with the reference process model (e.g., that the AS-IS process model may need to be redesigned).

In some implementations, the mapping component may cause one or more queries, relating to mapping decisions made by the mapping component, to be presented to a user (e.g., via the interactive UI) for feedback purposes. For example, the mapping component may query a user regarding the user's satisfaction with a mapping of a node to a consecutive stage pair identified in the repository. Continuing the example, a response that indicates that the user is satisfied with the particular mapping decision may cause the mapping component to increase a count value for the consecutive stage pair in the repository. Further continuing the example, in a case where no response is received from the user, the mapping component may consider the lack of a response as an indication of the user's satisfaction with the particular mapping decision. In some implementations, the mapping component may permit the user to input information regarding new pairs of consecutive stages that are not yet included in the repository.

In this way, the mapping component may apply historical data during a mapping process for a current AS-IS process model, and enable the addition of new data in the repository for use in future mappings.

As shown by reference number 104, the annotation canvas component may generate annotations based on a result of the mapping process. As shown by reference number 105, the mapping component and/or the annotation canvas component may provide, to the interactive UI, the annotations for display. In some implementations, the mapping component and the annotation canvas may interact with one another to cause information, regarding the AS-IS process model and the reference process model, to be provided to the interactive UI. In some implementations, the interactive UI may display the AS-IS process model and the reference process model juxtaposed with one another for ease of comparison, as described below in connection with FIG. 1L.

In some implementations, the annotations may include text, graphics, and/or like visual representations that provide information relating to one or more nodes of the AS-IS process model and the reference process model. The information may include, for example, information identifying one or more nodes of the AS-IS process model that correspond to one or more nodes of the reference process model, information identifying one or more nodes of the AS-IS process model that may be compressed, information identifying one or more nodes of the AS-IS process model that may be expanded, and/or the like. An example annotation process is described below in connection with FIGS. 1I and 1J, and an example interactive UI showing annotations are described below in connection with FIG. 1M.

Figure 1B:
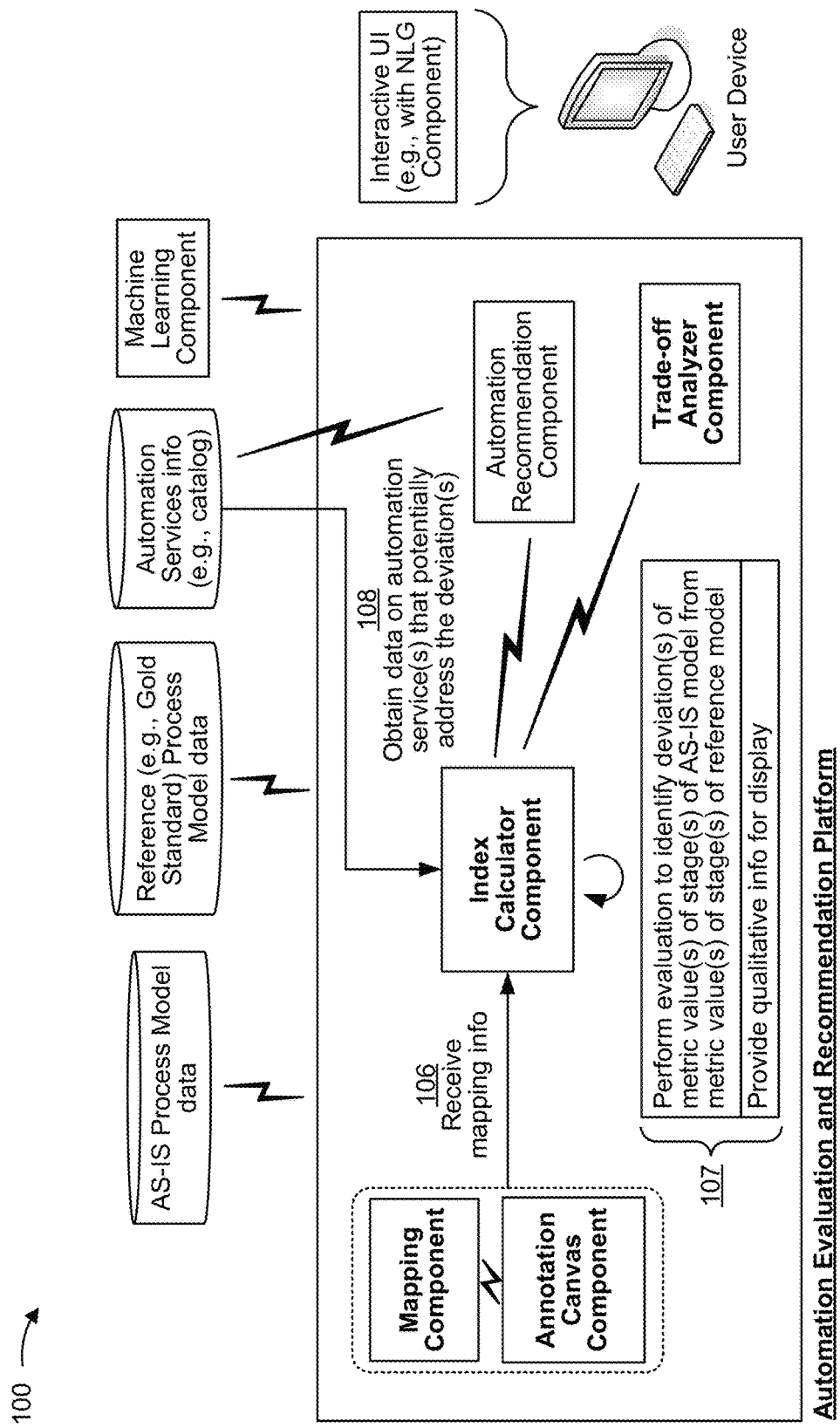

As shown in FIG. 1B, and as shown by reference number 106, the index calculator component may receive, from the mapping component, information regarding the mapping process. As shown by reference number 107, the index calculator component may perform an evaluation to identify deviation(s) (or differences) of metric value(s) relating to one or more stages of the AS-IS process model from metric value(s) relating to corresponding stage(s) of the reference process model, and provide qualitative information regarding the evaluation for display. An example interactive UI is described below in connection with FIG. 1N. A metric may include a time to perform a particular task associated with a stage of a process, a cycle time, a cost, an error rate, and/or the like, and, in a reference process model, may be associated with threshold and/or range specification(s) that set a standard to be met.

As shown by reference number 108, the index calculator component may obtain, from the automation services data structure, data relating to one or more automation services. In some implementations, the index calculator component may interact with the automation recommendation component to receive recommendations on automation service(s) that are relevant based on the data relating to the AS-IS process model, the data relating to the reference process model, and/or the information regarding the mapping process. As one example, the index calculator component may submit a request for, and receive from the automation recommendation component, data relating to one or more automation services that potentially address, or compensate for, the above-mentioned deviation(s) of the metric value(s) and/or the like.

Figure 1C:
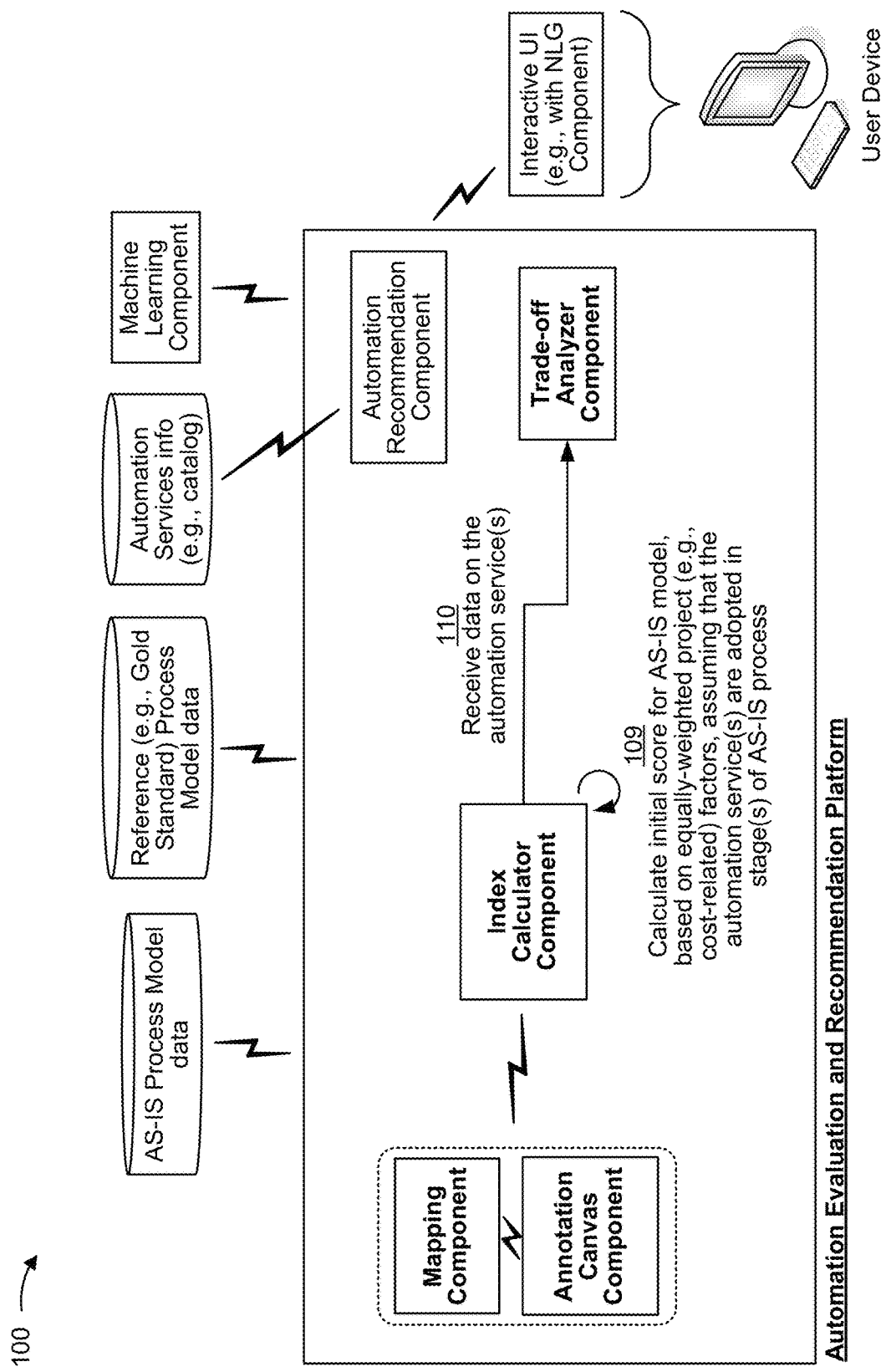

As shown in FIG. 1C, and as shown by reference number 109, the index calculator component may calculate an initial score for the AS-IS process model. In some implementations, and as briefly described above, the reference process model may represent an ideal (e.g., gold standard) process having standards that a business enterprise may want the business enterprise's business process (e.g., the AS-IS process) to strive to meet. In such cases, the reference process model may have a full score (e.g., a score of "1" and/or the like), where each stage is weighted (e.g., has a predetermined weight value) and contributes to the full score based on the weight value. Each stage of the AS-IS process model may be similarly weighted and contribute to a corresponding score based on the weight value.

In a case where there exists deviation(s) of metric value(s) of one or more stages of the AS-IS process model from metric value(s) of corresponding stage(s) of the reference process model (e.g., as described above), a score of the AS-IS process model may be less than a full score. Here, the index calculator component may, with the assumption that adoption of the one or more automation service(s) in the AS-IS process may increase the score for the AS-IS process model (e.g., to a score that is closer to a full score of "1"), calculate an initial score for the AS-IS process model based on certain project factors (e.g., business-related or cost-related factors) and based on the data relating to the one or more automation services.

The project factors may relate to cost, effort needed to utilize an automation service, business impact (e.g., impact on generated profits), dependency (e.g., among automation services), and/or the like. For example, the project factors may include a cost per unit if an automation service under consideration is not adopted ($C_C$), a cost of adopting the automation service ($C_A$), a cost of using the automation service ($C_U$), a business impact of not using the automation service ($C_{BI}$), and/or the like. In some implementations, the project factors may depend on certain project-dependent costs and/or automation-dependent costs (e.g., hardware costs, training costs related to automation, license costs, IT support costs, and/or the like), and whether a given automation service is to be adopted may depend on such project factors.

In some implementations, the index calculator component may associate the project factors with equal weights, and calculate the initial score based the equal weights. For example, in a case where the project factors include $C_C$, $C_A$, $C_U$, and $C_{BI}$, the index calculator component may associate a 25% weighting with each of these project factors when calculating the initial score.

Figure 1D:
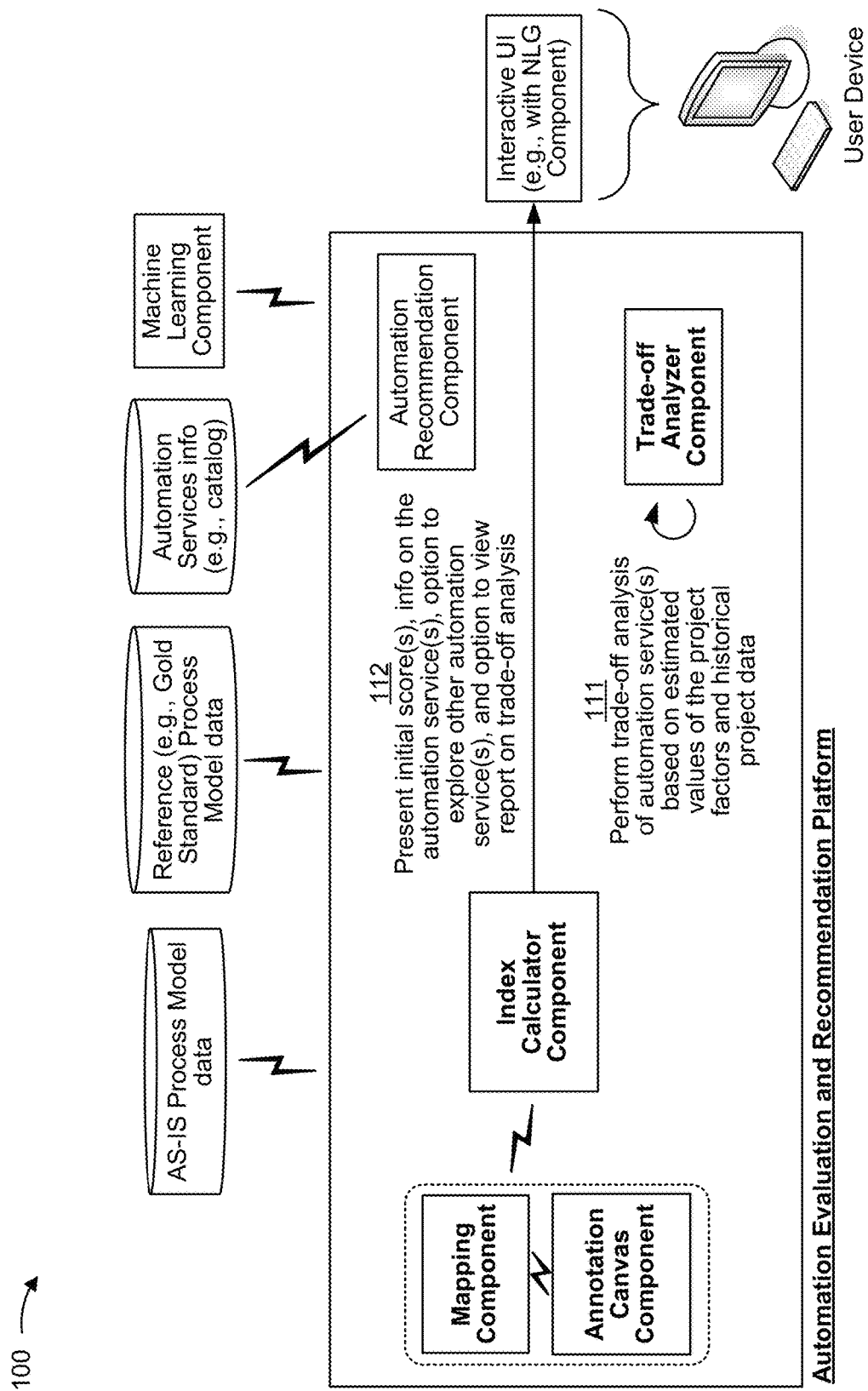

As shown by reference number 110, the trade-off analyzer component may receive, from the index calculator component, data relating to the one or more automation services. As shown in FIG. 1D, and as shown by reference number 111, the trade-off analyzer component may perform a comparative trade-off analysis of the one or more automation services (e.g., of alternative sets of the automation services), and determine whether the automation service(s) are likely to be adopted by a current project associated with the AS-IS process, based on values of the project factors and based on historical data on past automation service adoption decisions (e.g., in prior project(s) and/or the like).

In some implementations, the trade-off analyzer component may utilize the machine learning component to determine whether an automation service is likely to be adopted. In some implementations, the trade-off analyzer component may estimate the values of the project factors using regression analysis (e.g., a multiple linear regression technique). For example, the trade-off analyzer component may utilize multiple linear regression to calculate the values of $C_C$, $C_A$, $C_U$, and $C_{BI}$. In some implementations, the trade-off analyzer component may analyze historical data, such as that shown in Table 2 below.

TABLE 2

| $C_C$ | $C_A$ | $C_U$ | $C_{BI}$ | Automation Adoption (AA) Decision |
|---|---|---|---|---|
| 4500 | 5498 | 7000 | 12038 | 1 (yes) |
| 7344 | 4576 | 189 | 3478 | 0 (no) |
| 23423 | 4545 | 8945 | 4624 | 1 (yes) |
| ... | ... | ... | ... | ... |

Table 2 shows a repository that includes historical data relating to project factors and corresponding decisions to adopt, or not adopt, an automation service (where AA may be a dependent variable, and $C_C$, $C_A$, $C_U$, and $C_{BI}$ may be independent variables). Here, the trade-off analyzer component may determine whether an automation service is likely to be adopted by a current project using a logistic regression classification machine learning technique—e.g., in accordance with the following formula:

$$p = 1/(1+e^{-(b0+b1 \cdot x1+b2 \cdot x2+b3 \cdot x3+b4 \cdot x4)}),$$

where b0, b1, b2, b3, and b4 are constants, $x1=C_C$, $x2=C_A$, $x3=C_U$, and $x4=C_{BI}$.

In a case where the trade-off analyzer component determines a value of p that satisfies a threshold (e.g., is less than 0.5), the trade-off analyzer component may output a notification (e.g., for display via the interactive UI) indicating that adoption of the automation service is not advised. In a case where the trade-off analyzer component determines a value of p that does not satisfy the threshold (e.g., is greater than or equal to 0.5), the trade-off analyzer component may continue to a following workflow item (e.g., which may include outputting a notification, via the interactive UI, indicating that adoption of the automation service is advised).

As shown by reference number 112, the index calculator component may provide, to the interactive UI for display, the initial score(s), information regarding the relevant automation service(s), and option(s) to explore other automation services (e.g., that are available in the automation services data structure, and which may be recommended by the automation recommendation component). An example interactive UI is described below in connection with FIG. 1O.

Figure 1E:
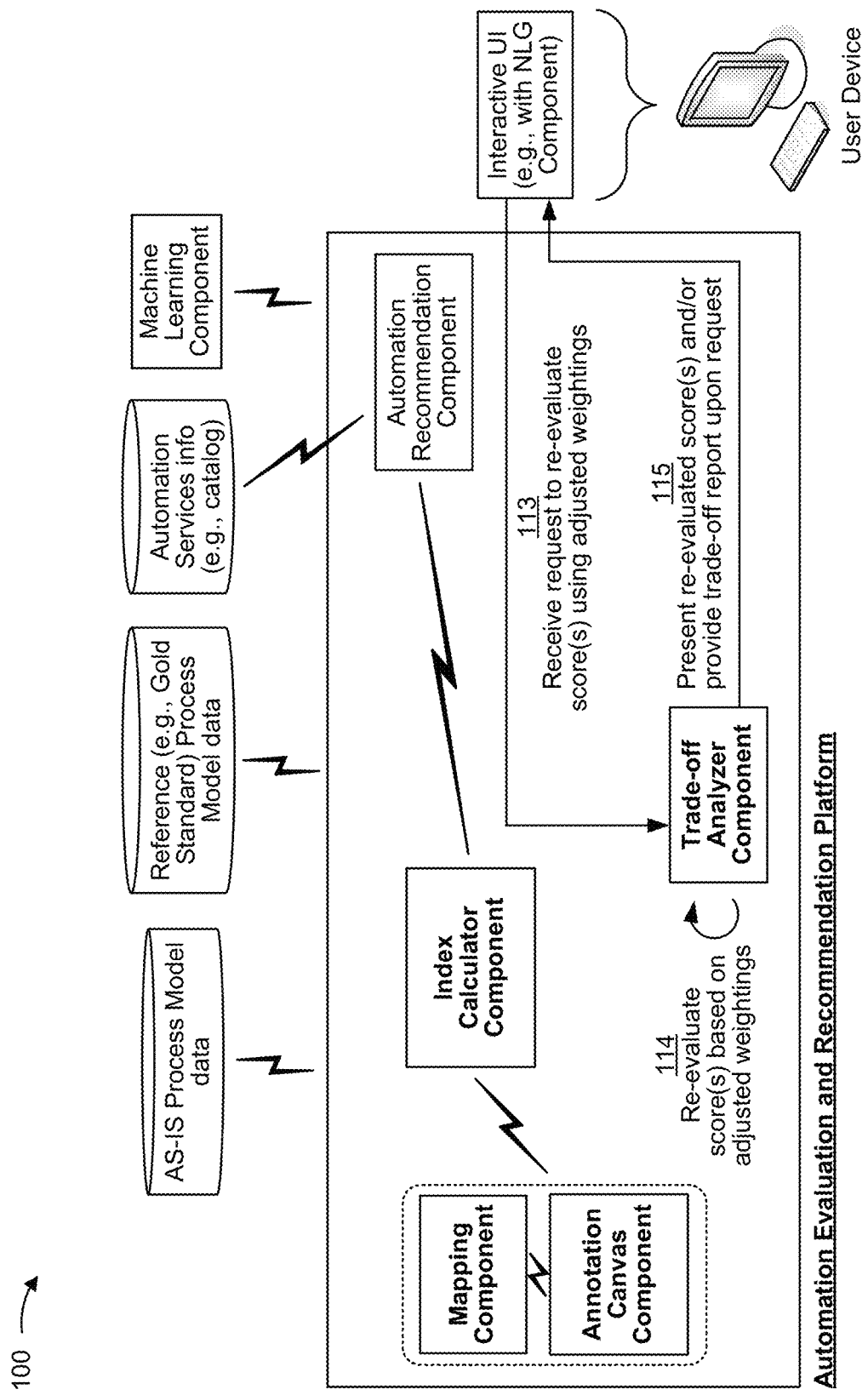

As shown in FIG. 1E, and as shown by reference number 113, the trade-off analyzer component may receive a request to re-evaluate the score(s) using adjusted weightings for the project factors. In some implementations, the trade-off analyzer component may cause the interactive UI to provide option(s) for a user to adjust the weightings of the project factors, and to submit a request to re-evaluate the score(s) based on the adjusted weightings. In such a case, the trade-off analyzer component may receive the request from the interactive UI. An example interactive UI is described below in connection with FIG. 1P.

As shown by reference number 114, the trade-off analyzer component may re-evaluate the score(s) based on the adjusted weightings of the project factors. As shown by reference number 115, the trade-off analyzer component may provide, to the interactive UI, information regarding the re-evaluated score(s) for display. In some implementations, the trade-off analyzer component may cause the interactive UI to present one or more user-selectable options to view recommendations regarding the automation service(s). An example interactive UI is described below in connection with FIG. 1Q.

In some implementations, the trade-off analyzer component may also cause the interactive UI to provide option(s) for a user to select one or more automation services to deploy in the AS-IS process and/or one or more option(s) for the user to review or explore the recommended automation service(s). An example interactive UI is described below in connection with FIG. 1R. In some implementations, the trade-off analyzer component may cause the interactive UI to provide a copy of a report on the trade-off analysis for display. An example portion of a trade-off analysis report is described below in connection with FIG. 1S.

In this way, the automation evaluation and recommendation platform enables a user (e.g., a business owner, a subject matter expert, and/or the like) to select (and/or deploy) an optimal set of automation service(s) to improve the AS-IS process, allowing for prioritization of automation for stages that have higher contribution ratios to the overall AS-IS process than for stages that have lower contribution ratios.

Figure 1F:
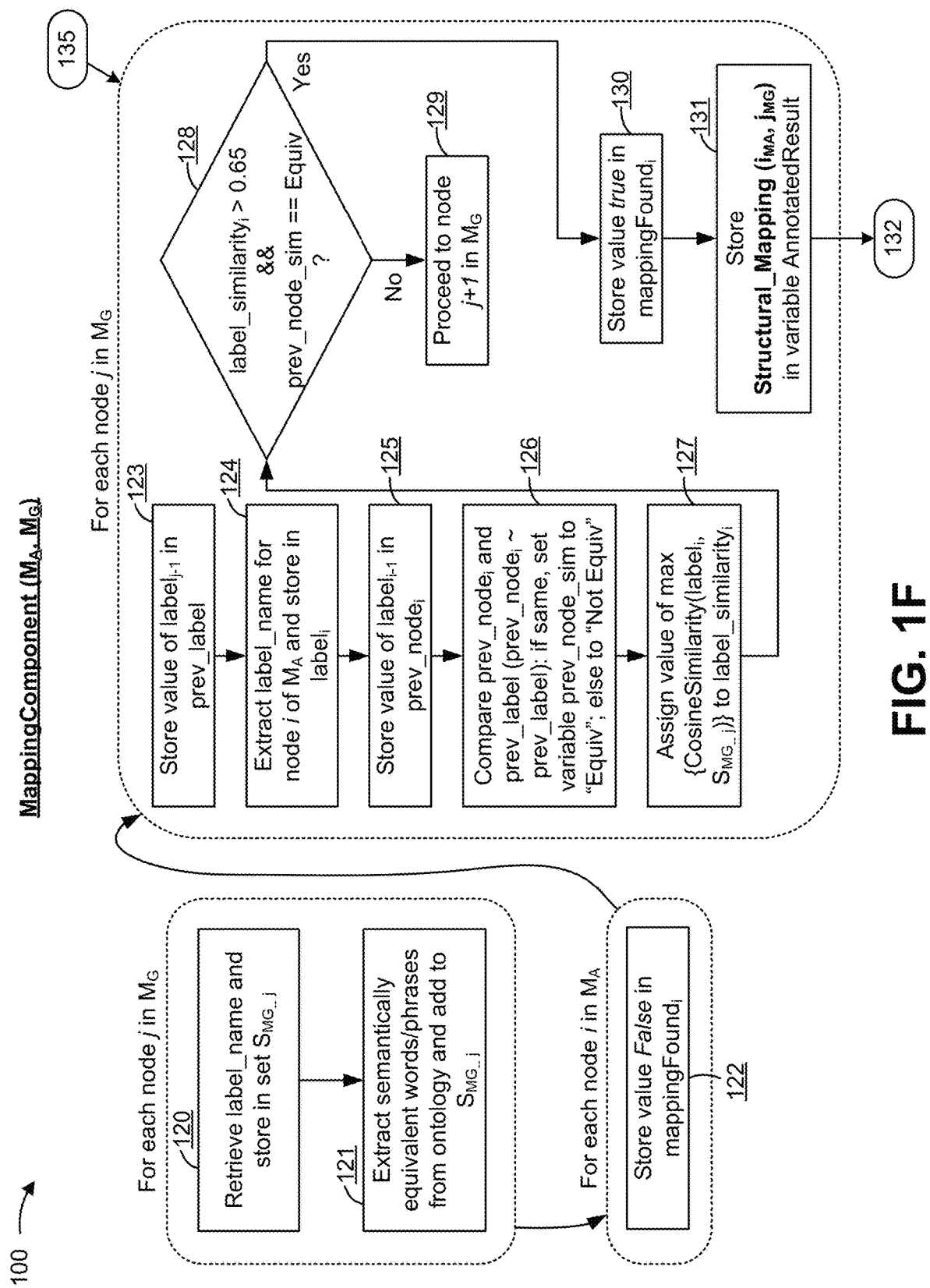
Figure 1G:
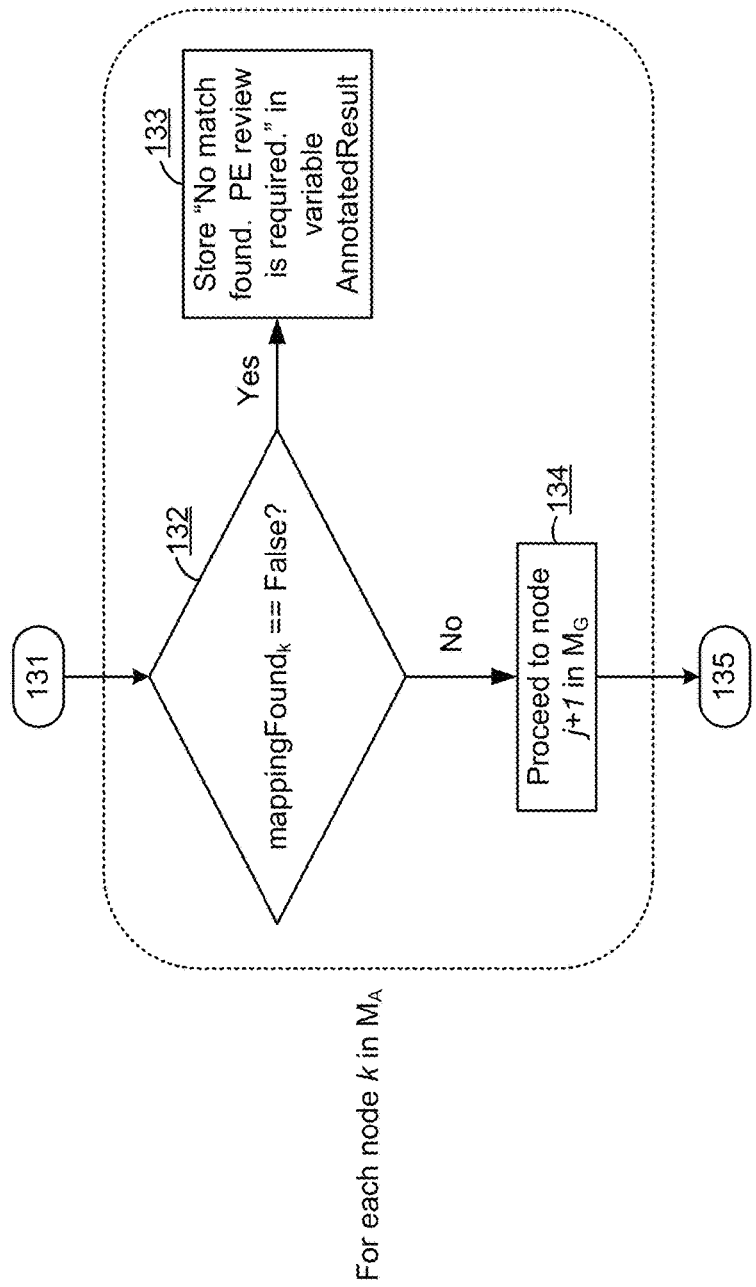
Figure 1H:
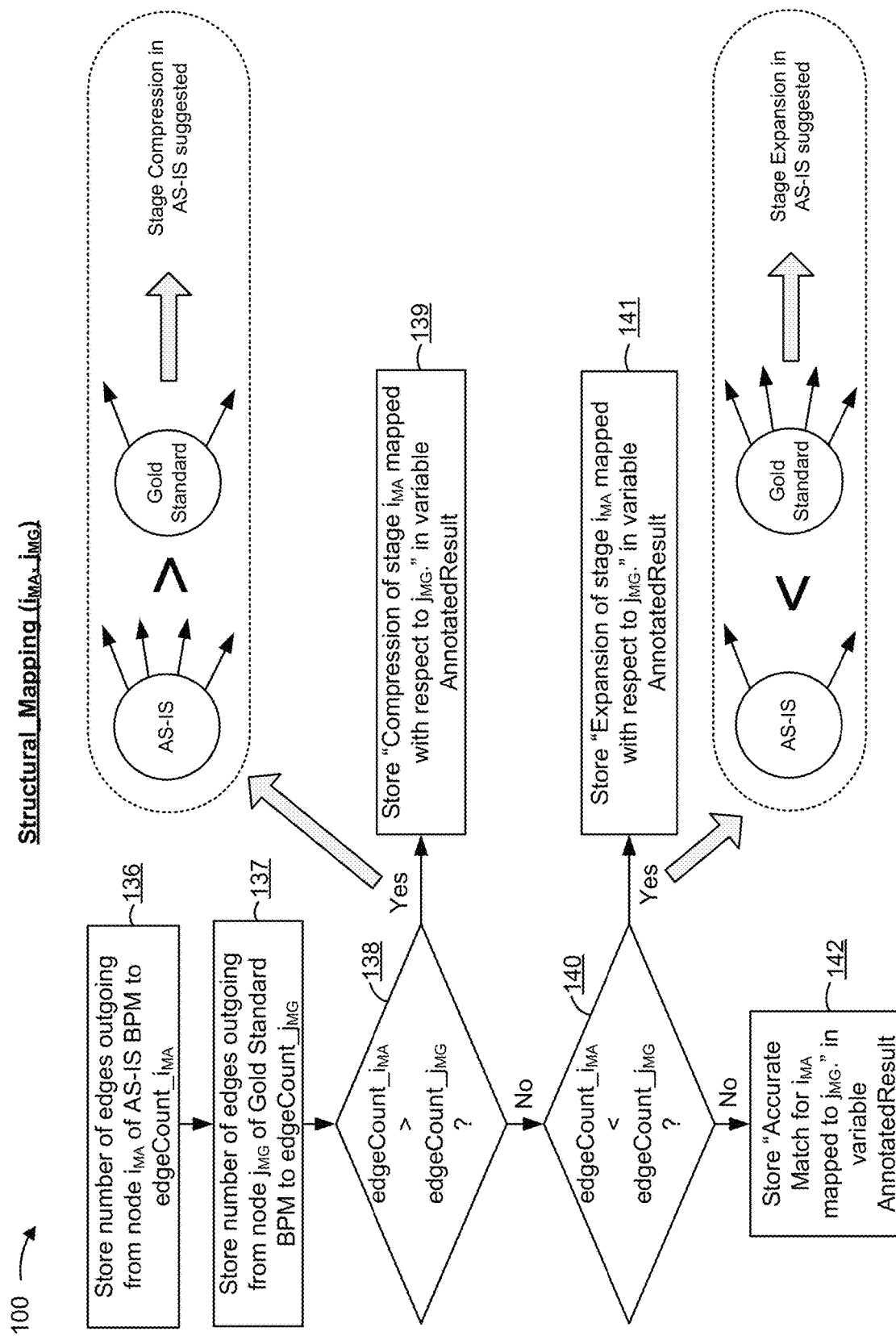

FIGS. 1F-1H are diagrams of example processes for mapping an AS-IS process model to a reference process model. As shown in FIGS. 1F-1H, the example processes may include processes labeled BPM_MappingComponent ($M_A$, $M_G$) and Structural_Mapping($i_{MA}$, $j_{MG}$), where $M_A$ represents the AS-IS process model, $M_G$ represents the reference process model, and i and j represent nodes.

As shown in FIG. 1F, and as shown by reference number 120, for each node j in $M_G$, the mapping component may obtain a label name (label_name) of the node, and store the label name in a data structure (e.g., a set) $S_{MG\_j}$. As shown by reference number 121, the mapping component may obtain (e.g., extract) words and/or phrases that are semantically equivalent to the label_name, and store such words and/or phrases in the set $S_{MG\_j}$.

As shown by reference number 122, for each node i in $M_A$, the mapping component may initially store a value False in a variable mappingFound$_i$. The mapping component may then perform various steps for each node j in $M_G$. As shown by reference number 123, the mapping component may store a value of a variable label$_{j-1}$ in a variable prev_label. As shown by reference number 124, the mapping component may obtain (e.g., extract) a label_name of node i in $M_A$, and store the label_name in a variable label$_i$. As shown by reference number 125, the mapping component may store a value of a variable label$_{i-1}$ in a variable prev_node$_i$.

As shown by reference number 126, the mapping component may compare the value of the variable prev_node$_i$ and the value of the variable prev_label. In a case where the value of the variable prev_node$_i$ and the value of the variable prev_label are the same, the mapping component may store a value "Equiv" (and/or the like) in a variable prev_node_sim. In a case where the value of the variable prev_node$_i$ and the value of the variable prev_label are not the same, the mapping components may store a value "Not Equiv" (and/or the like) in the variable prev_node_sim.

As shown by reference number 127, the mapping component may perform a cosine similarity operation on the variable label$_i$ and value(s) in the set $S_{MG\_j}$ (e.g., CosineSimilarity(label$_i$, $S_{MG\_j}$), and store a maximum value of the results, of the cosine similarity operation, in a variable label_similarity$_i$. As shown by reference number 128, the mapping component may determine whether the value of the variable label_similarity$_i$ satisfies a threshold (e.g., is greater than 0.65) and the value of the variable prev_node_sim is equal to "Equiv."

As shown by reference number 129, if the value of the variable label_similarity$_i$ does not satisfy the threshold (e.g., is not greater than 0.65) or if the value of the variable prev_node_sim is not equal to "Equiv," the mapping component may proceed to operate on node j+1 in $M_G$. As shown by reference number 130, if the value of the variable label_similarity$_i$ satisfies the threshold (e.g., is greater than 0.65) and the value of the variable prev_node_sim is equal to "Equiv," the mapping component may store a value True in the variable mappingFound$_i$. As shown by reference number 131, the mapping component may then store, in a variable AnnotatedResult, a value of a result of a structural mapping process (e.g., Structural_Mapping($i_{MA}$, $j_{MG}$) described in more detail below in connection with FIG. 1H).

As shown in FIG. 1G, and as shown by reference number 132, for each node i in $M_A$ (referred to here as node k for this portion of the mapping process), the mapping component may determine whether the value of the variable mappingFound$_k$ is False (e.g., whether no match is found for the node based on steps 120 to 130 described above). As shown by reference number 133, if the value of the variable mappingFound$_k$ is False, the mapping component may store information indicating that no match is found for that node (e.g., "No match found. Process Expert review is needed."). As shown by reference numbers 134 and 135, the mapping component may then proceed to operate on node j+1 in $M_G$, and so on.

As shown in FIG. 1H, and as shown by reference number 136, the mapping component may store a value, indicating a quantity of outgoing edges from node i (or here, referred to as $i_{MA}$) in a variable edgeCount_$i_{MA}$. As shown by reference number 137, the mapping component may store a value, indicating a quantity of outgoing edges from node j (or here, referred to as $j_{MG}$), in a variable edgeCount_$j_{MG}$.

As shown by reference number 138, the mapping component may determine if the value of edgeCount_$i_{MA}$ is greater than edgeCount_$j_{MG}$.

As shown by reference number 139, if the value of edgeCount_$i_{MA}$ is greater than edgeCount_$j_{MG}$, the mapping component may store, in the variable AnnotatedResult, information indicating that compression of node $i_{MA}$ (e.g., compression of a corresponding stage of the AS-IS process) is suggested (e.g., "Compression," "Compression Suggested," "Compression of $i_{MA}$ mapped with respect to $j_{MG}$," and/or the like). As shown by reference number 140, if the value of edgeCount_$i_{MA}$ is not greater than edgeCount_$j_{MG}$, the mapping component may determine if the value of edgeCount_$i_{MA}$ is less than edgeCount_$j_{MG}$.

As shown by reference number 141, if the value of edgeCount_$i_{MA}$ is less than edgeCount_$j_{MG}$, the mapping component may store, in the variable AnnotatedResult, information indicating that expansion of node $i_{MA}$ (e.g., expansion of the corresponding stage of the AS-IS process) is suggested (e.g., "Expansion," "Expansion Suggested," "Expansion of $i_{MA}$ mapped with respect to $j_{MG}$," and/or the like). As shown by reference number 142, if the value of edgeCount_$i_{MA}$ is not less than edgeCount_$j_{MG}$ (e.g., if edgeCount_$i_{MA}$ is equal to edgeCount_$j_{MG}$), the mapping component may store, in the variable AnnotatedResult, information indicating that an accurate match is found (e.g., "Accurate Match," "Accurate Match for stage $i_{MA}$ mapped with respect to $j_{MG}$," and/or the like).

Figure 1I:
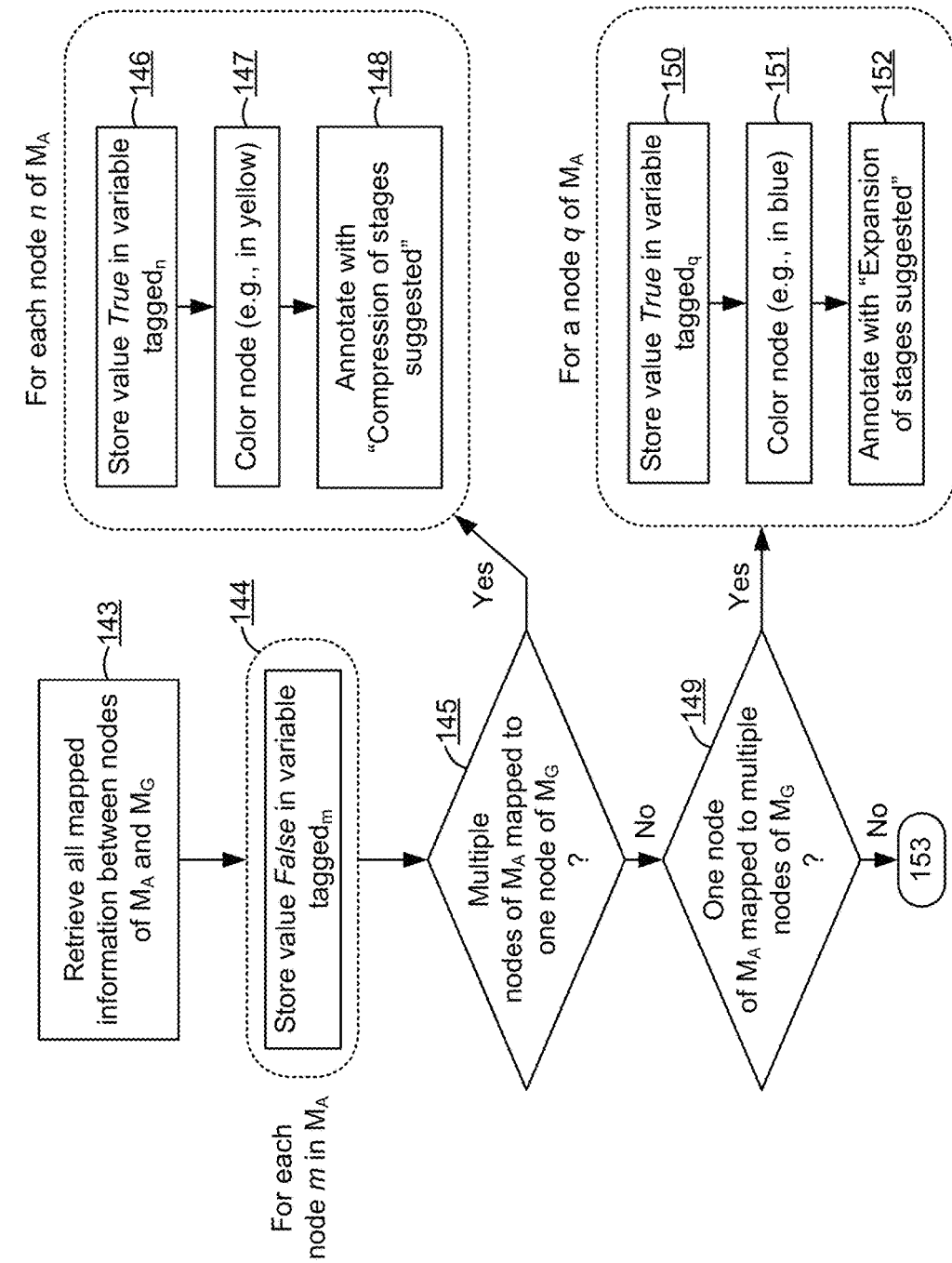
Figure 1J:
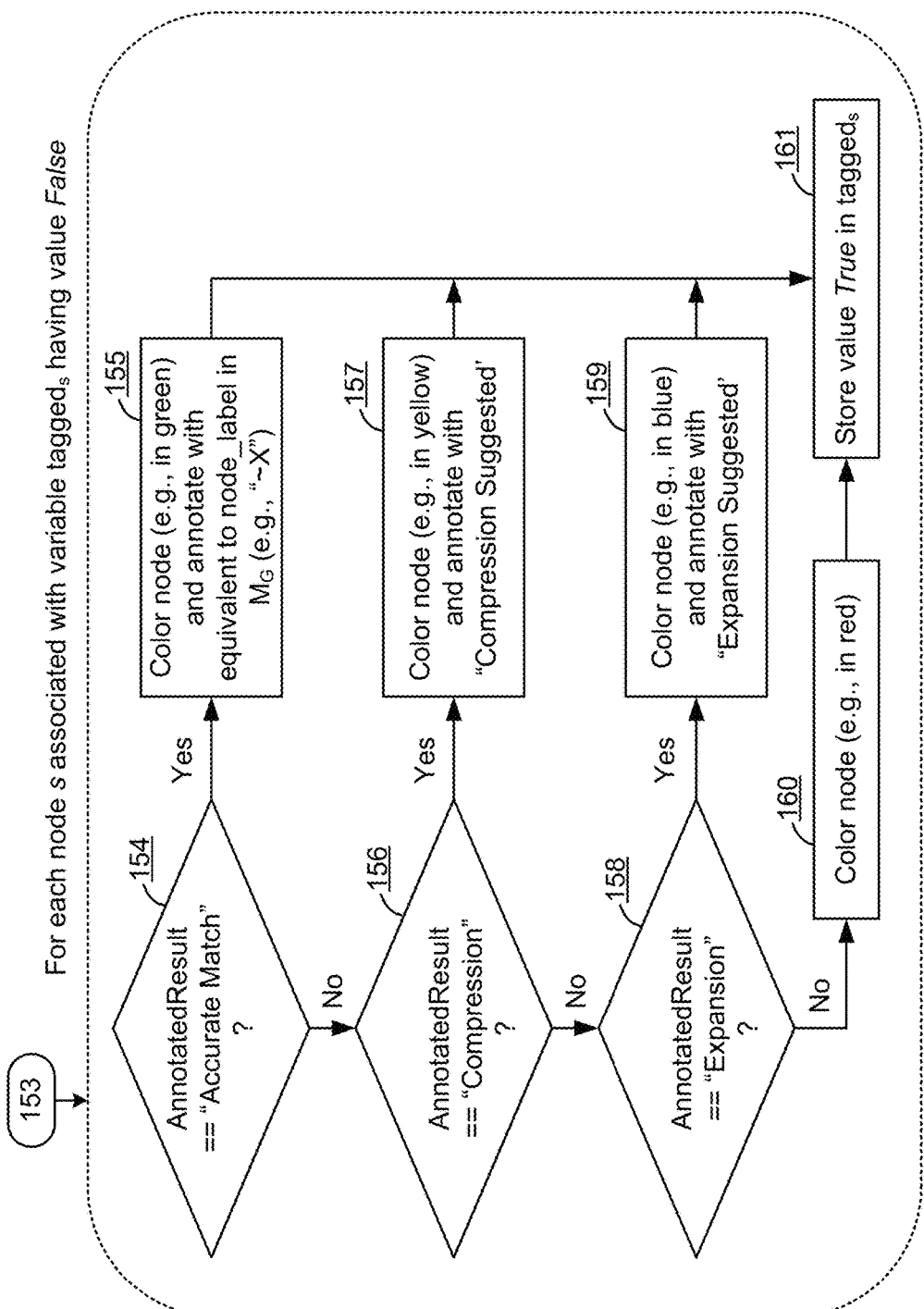

FIGS. 1I and 1J are diagrams of an example process (e.g., a process labeled BuildAnnotationCanvas($M_A$, $M_G$)) for annotating a canvas (e.g., a canvas displayed on the interactive UI) with details regarding the mapping of an AS-IS process model to a reference process model. As shown in FIG. 1I, and as shown by reference number 143, the mapping component may obtain (e.g., retrieve) mapped information (e.g., all mapped information) relating to the nodes of $M_A$ and $M_G$. As shown by reference number 144, for each node i of $M_A$ (referred to here as node m for the annotation process), the mapping component may initially store a value False in a variable tagged$_m$.

As shown by reference number 145, the mapping component may determine whether multiple nodes of $M_A$ are mapped to one node of $M_G$. As shown by reference numbers 146, 147, and 148, if multiple nodes of $M_A$ are mapped to one node of $M_G$, the mapping component may, for each such node i (referred to here as node n for this portion of the annotation process), store a value True in a variable tagged$_n$ associated with that node, cause the interactive UI to display a visual representation of the corresponding stage in a certain color (e.g., yellow and/or the like), and cause the interactive UI to display an annotation suggesting stage compression (e.g., "Compression of stages suggested").

As shown by reference number 149, if multiple nodes of $M_A$ are not mapped to a single node of $M_G$, the mapping component may determine whether a single node of $M_A$ is mapped to multiple nodes of $M_G$. As shown by reference numbers 150, 151, and 152, if a single node of $M_A$ is mapped to multiple nodes of $M_G$, the mapping component may, for such a node i (referred to here as node q for this portion of the annotation process), store a value True in the variable tagged$_q$, cause the interactive UI to display a visual representation of the corresponding stage in a certain color (e.g., blue and/or the like), and cause the interactive UI to display an annotation suggesting stage expansion (e.g., "Expansion of stage suggested"). As shown by reference number 153, the annotation canvas component may perform additional steps for other nodes that have not yet been displayed on the annotation canvas.

As shown in FIG. 1J, and as shown by reference number 154, for each node i (referred to here as node s for this portion of the annotation process) is associated with a variable tagged$_s$ having a value set to False, the mapping component may determine whether the value of the variable AnnotatedResult indicates that there is an accurate match for that node (e.g., is equal to "Accurate Match" and/or the like).

As shown by reference number 155, if the value of the variable AnnotatedResult indicates that there is an accurate match, the mapping component may cause the interactive UI to display a visual representation of the corresponding stage in a certain color (e.g., green and/or the like), and cause the interactive UI to display an annotation indicating that the label of the node is equivalent to a node label or label name in $M_G$ (e.g., "~X").

As shown by reference number 156, if the variable AnnotatedResult indicates that there is not an accurate match for that node, the mapping component may determine whether the value of the variable AnnotatedResult indicates that compression is suggested (e.g., is equal to "Compression" and/or the like). As shown by reference number 157, if the value of the variable AnnotatedResult indicates that compression is suggested, the mapping component may cause the interactive UI to display a visual representation of the corresponding stage in a certain color (e.g., yellow and/or the like), and cause the interactive UI to display an annotation indicating that compression of the stage is suggested (e.g., "Compression of the stages suggested").

As shown by reference number 158, if the value of the variable AnnotatedResult does not indicate that compression is suggested, the mapping component may determine whether the value of the variable AnnotatedResult indicates that expansion is suggested (e.g., is equal to "Expansion" and/or the like). As shown by reference number 159, if the value of the variable AnnotatedResult indicates that expansion is suggested, the mapping component may cause the interactive UI to display a visual representation of the corresponding stage in a certain color (e.g., blue and/or the like), and cause the interactive UI to display an annotation indicating that expansion of the stage is suggested (e.g., "Expansion of the stages suggested"). As shown by reference number 160, if the value of the variable AnnotatedResult does not indicate that expansion is suggested, the mapping component may cause the interactive UI to display a visual representation of the stage in a certain color (e.g., red and/or the like). As shown by reference number 161, the mapping component may then store a value True in the corresponding variable tagged$_s$.

In this way, the automation evaluation and recommendation platform may provide visual information, regarding a mapping process, to a user that enables the user to easily identify areas of an AS-IS process model that differ from a reference process model.

Figure 1K:
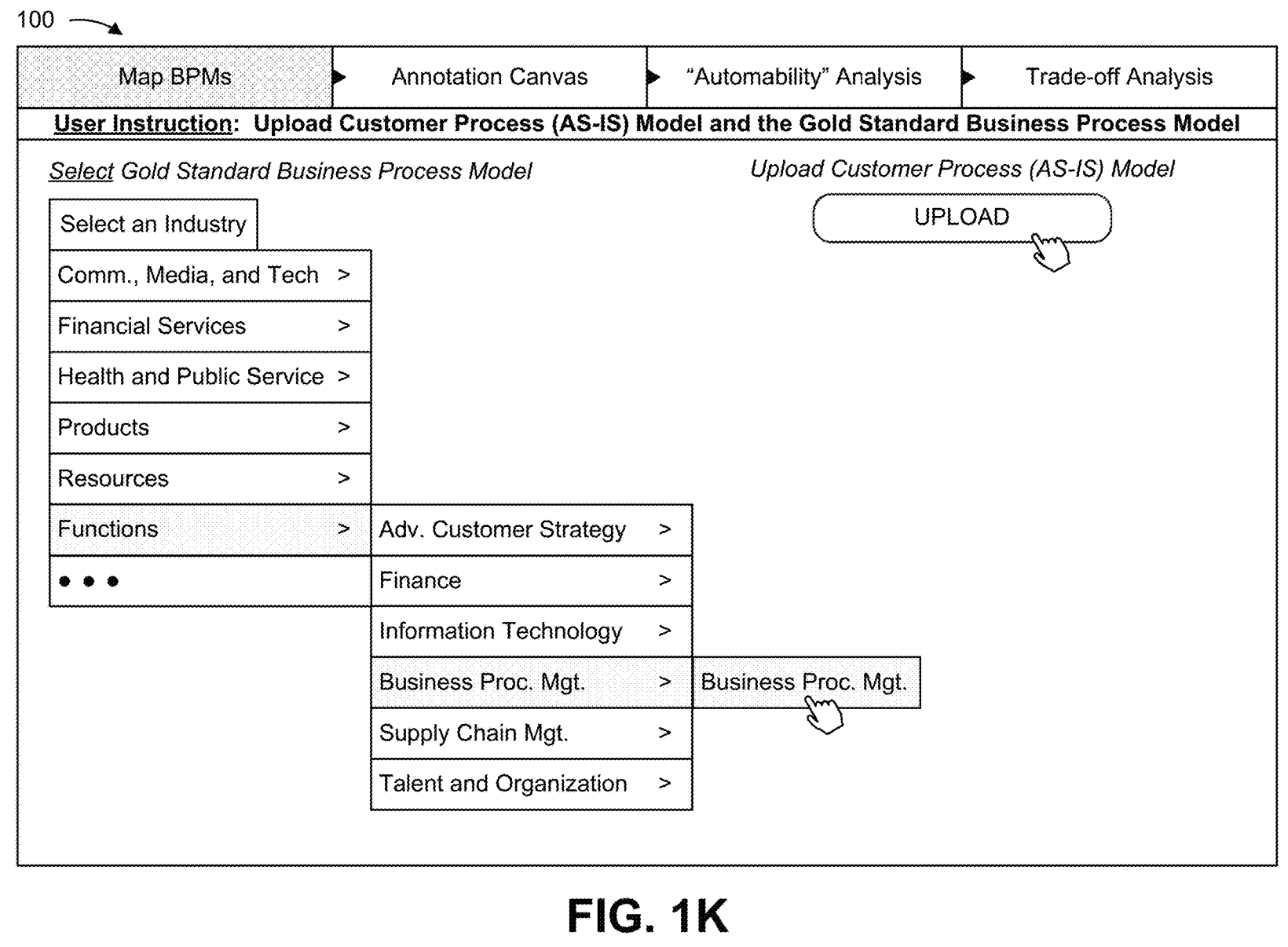

FIG. 1K is a diagram illustrating an example interactive UI that enables selection of a reference process model, such as a gold standard BPM, and uploading of an AS-IS process model. As shown in FIG. 1K, the interactive UI may provide various user-selectable gold standard BPM's that can be used in the comparison with an AS-IS process model.

Figure 1L:
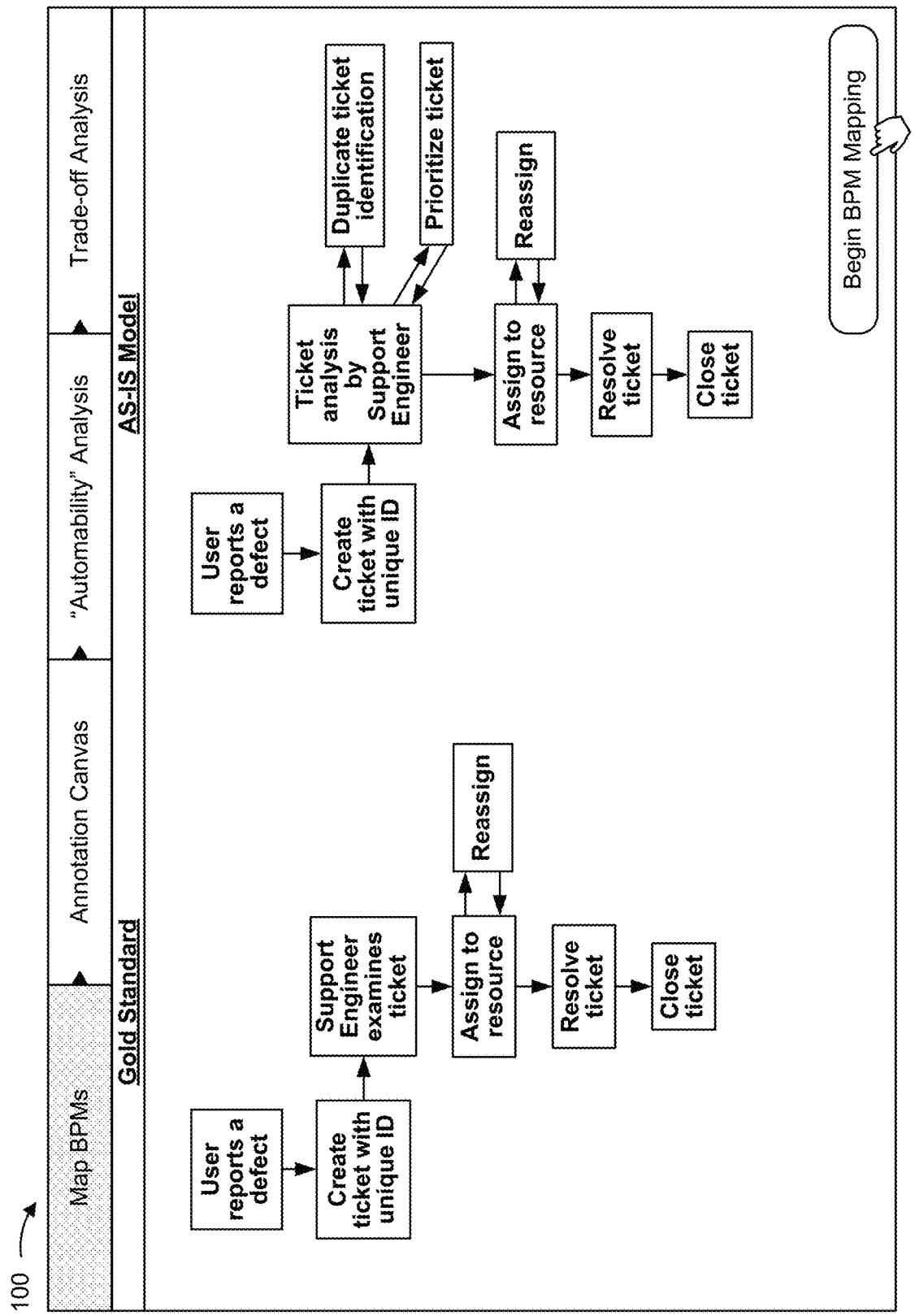

FIG. 1L is a diagram illustrating an example interactive UI that displays a selected gold standard BPM and an uploaded AS-IS process model. As shown, each of the gold standard BPM and the AS-IS process model may include multiple nodes (e.g., leading to one another via edges) that correspond to stages of the respective process. As further shown, the interactive UI may display the gold standard BPM and the AS-IS process model juxtaposed with one another, which permits a user to easily visualize differences between the gold standard BPM and the AS-IS process model.

Figure 1M:
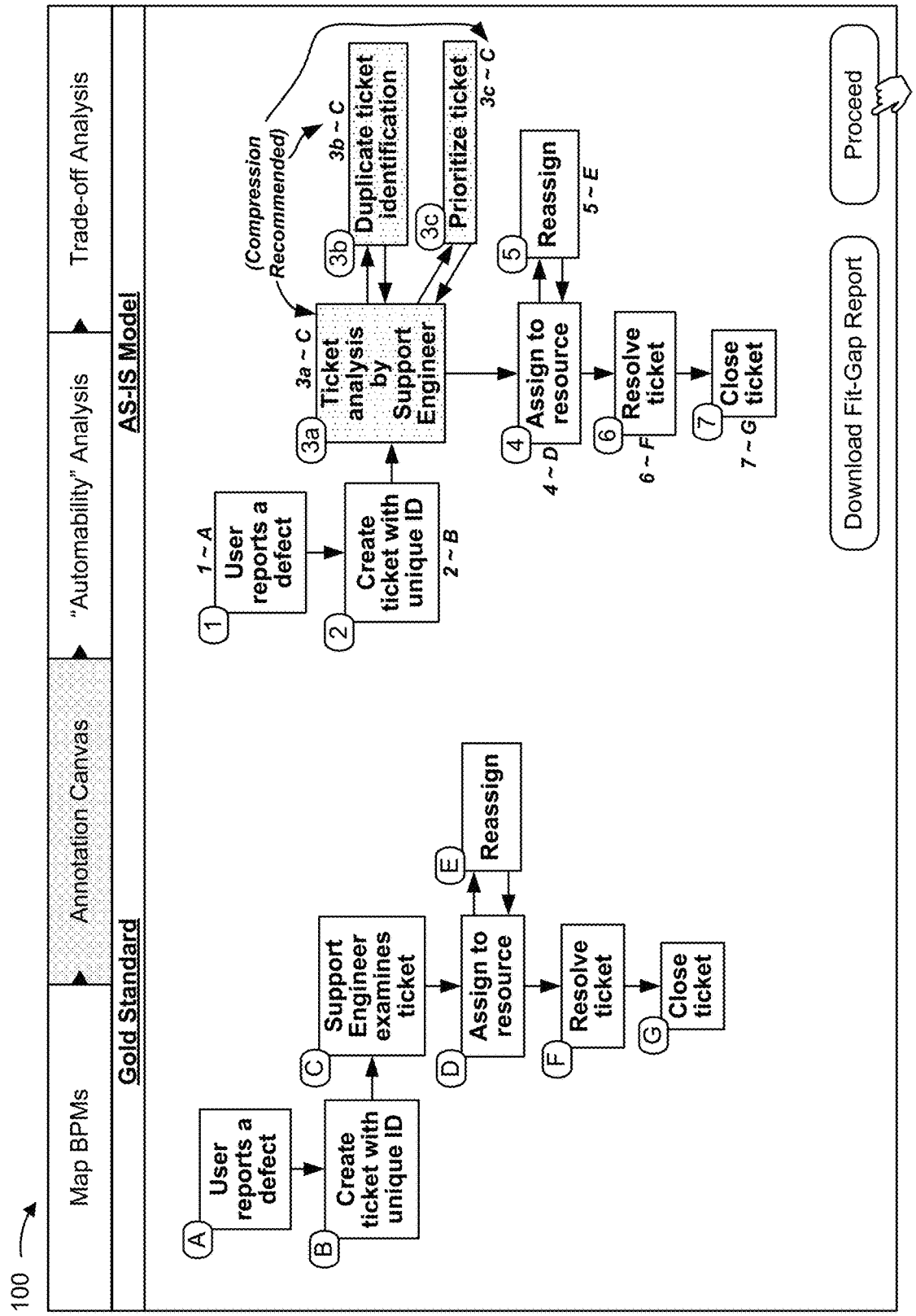

FIG. 1M is a diagram illustrating an example interactive UI that displays annotations relating to the gold standard BPM and the AS-IS process model. As shown, the interactive UI may, in accordance with instruction(s) from the mapping component and/or the annotation canvas component, display information regarding matches identified between nodes of the AS-IS process model and nodes of the gold standard BPM. For example, the interactive UI may display an indication 1~A to indicate that node 1 of the AS-IS process model matches node A of the gold standard BPM, an indication 2~B to indicate that node 2 of the AS-IS process model matches node B of the gold standard BPM, and so on. Here, the interactive UI may, due to the mapping component determining that nodes 3a, 3b, and 3c correspond to a single node C of the gold standard BPM, and in accordance with instruction(s) from the mapping component and/or the annotation canvas component, visually distinguish nodes 3a, 3b, and 3c from other nodes of the AS-IS process model. As further shown in FIG. 1M, the interactive UI may provide an option for a user to obtain a report (e.g., an intermediate, "fit-gap" report) that includes details relating to the mapping process, such as information regarding how well the AS-IS process model matches the gold standard BPM and/or the like.

Figure 1N:
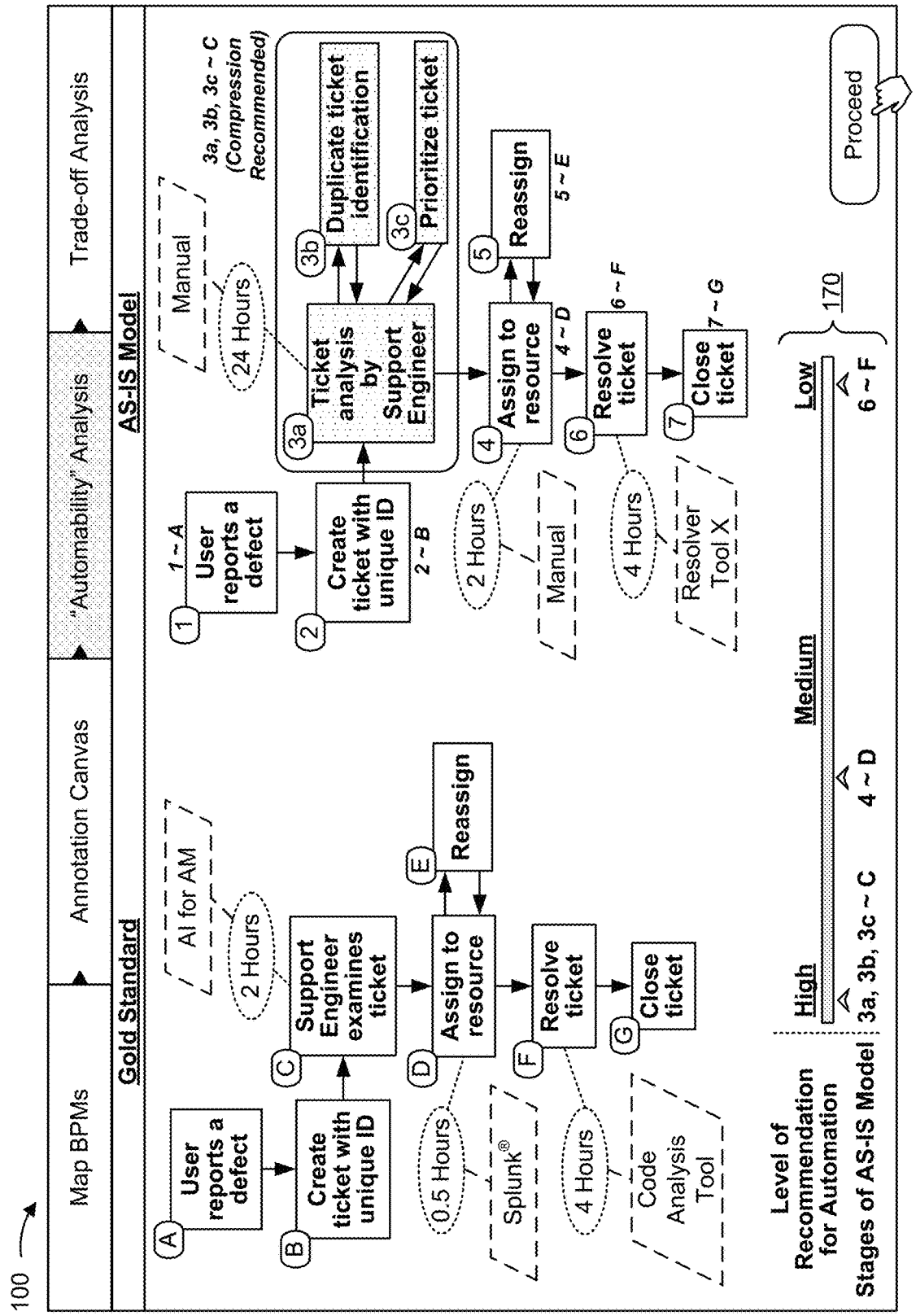
Figure 10:
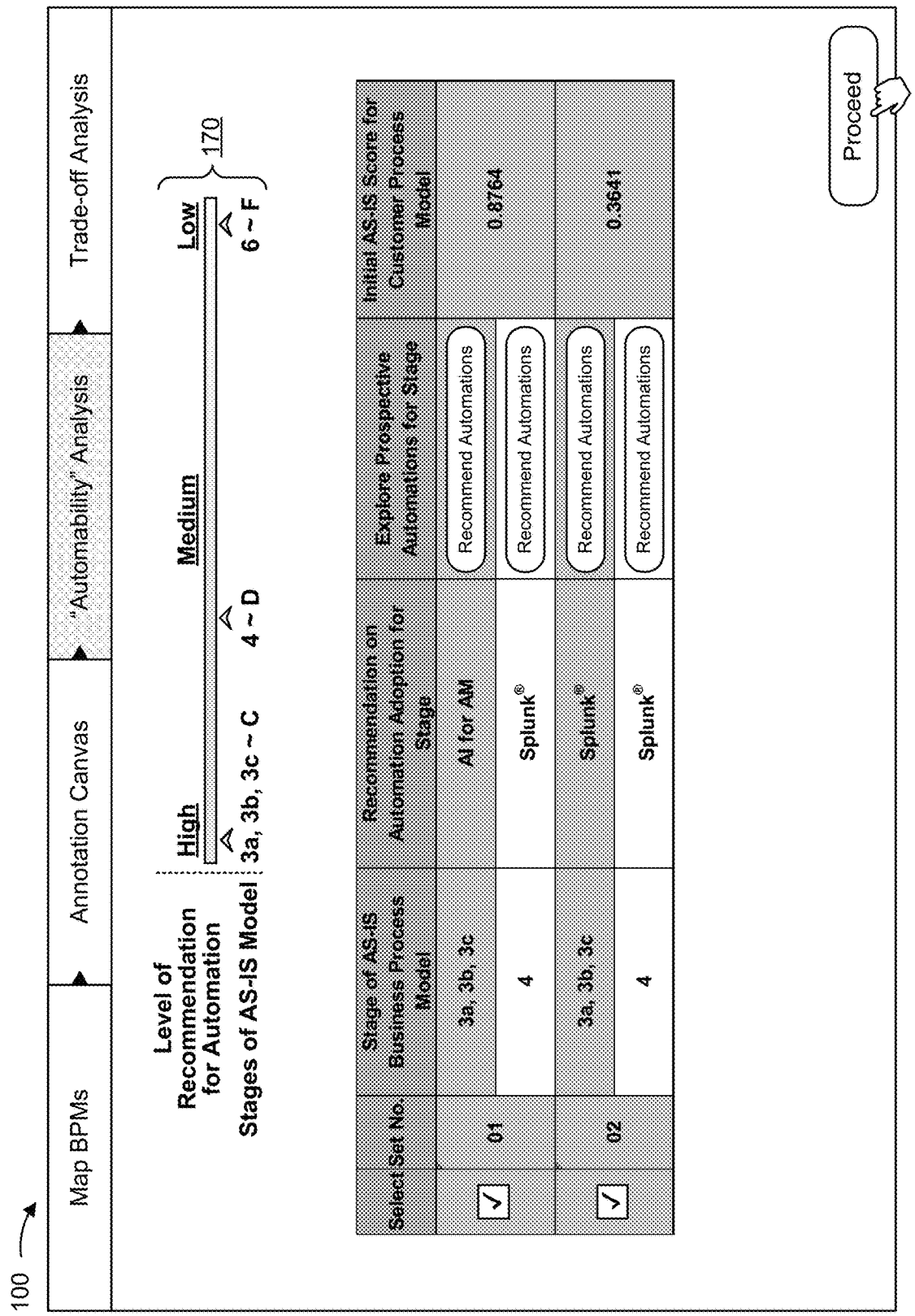

FIG. 1N is a diagram illustrating an example interactive UI that displays qualitative metric evaluation results provided by the index calculator component, as described above in connection with FIGS. 1A to 1E. Here, for example, the index calculator component may obtain performance information relating to a stage of the AS-IS process model, and determine, based on the performance information, that a value of a time-to-perform metric associated with the stage (e.g., 24-hours to complete a ticket analysis stage—here, corresponding nodes 3a, 3b, and 3c of the AS-IS process model) deviates from a value of the time-to-perform metric of a corresponding stage of the reference process model (e.g., 2-hours for the ticket analysis stage—here node C of the gold standard model). In some implementations, the index calculator component may determine whether the deviation satisfies one or more thresholds, and set an indicator representing a level, of recommendation that a stage (or stages) be automated, from low to high, depending on a result of the determination. For example, as shown in FIG. 1N, and as shown by reference number 170, the index calculator component may set, and display an indicator (e.g., represented via color spectrum) to high for nodes 3a, 3b, and 3c (e.g., high being associated with the color red and/or the like), to slightly higher than medium for node 4 (e.g., medium being associated with the color amber and/or the like, and to low for node 6 (e.g., low being associated with the color yellow and/or the like). In this way, the automation evaluation and recommendation platform may automatically indicate, to a user, the stages of the AS-IS process that can be improved via automation.

FIG. 1O is a diagram illustrating an example interactive UI that displays initial AS-IS score calculation (e.g., quantitative) results provided by the index calculator component, as described above in connection with FIGS. 1A to 1E. As shown in FIG. 1O, the interactive UI may present information regarding multiple sets—sets 01 and 02—of automation services that can address the deviation(s) identified between the AS-IS process model and the gold standard BPM, as well as corresponding initial calculated AS-IS scores. As further shown, the interactive UI may provide options for a user to explore other automation services (e.g., in the automation services data structure) that might also address the deviation(s).

FIG. 1P is a diagram illustrating an example interactive UI that displays a notification regarding weightings (e.g., percentages), of project factors, used in the initial AS-IS score calculation(s), and enabling adjustments of the weights, as described above in connection with FIGS. 1A to 1E. As shown in FIG. 1P, the interactive UI may permit adjustments to be made to weightings of various project factors (e.g., $C_C$, $C_A$, $C_U$, and $C_{BI}$) via adjustable sliders. As further shown, the interactive UI may provide an option ("Re-evaluate AS-IS Score") that, when selected, causes the trade-off analyzer component to re-evaluate the score(s) based on the adjusted weightings.

FIG. 1Q is a diagram illustrating an example interactive UI that displays re-evaluated AS-IS score calculation results, as described above in connection with FIGS. 1A to 1E. As shown in FIG. 1Q, the interactive UI may additionally provide options for a user to view detailed recommendations regarding the sets of automation services. For example, as shown, the interactive UI may display investment recommendation details, dependency recommendations, and/or the like.

Figure 1R:
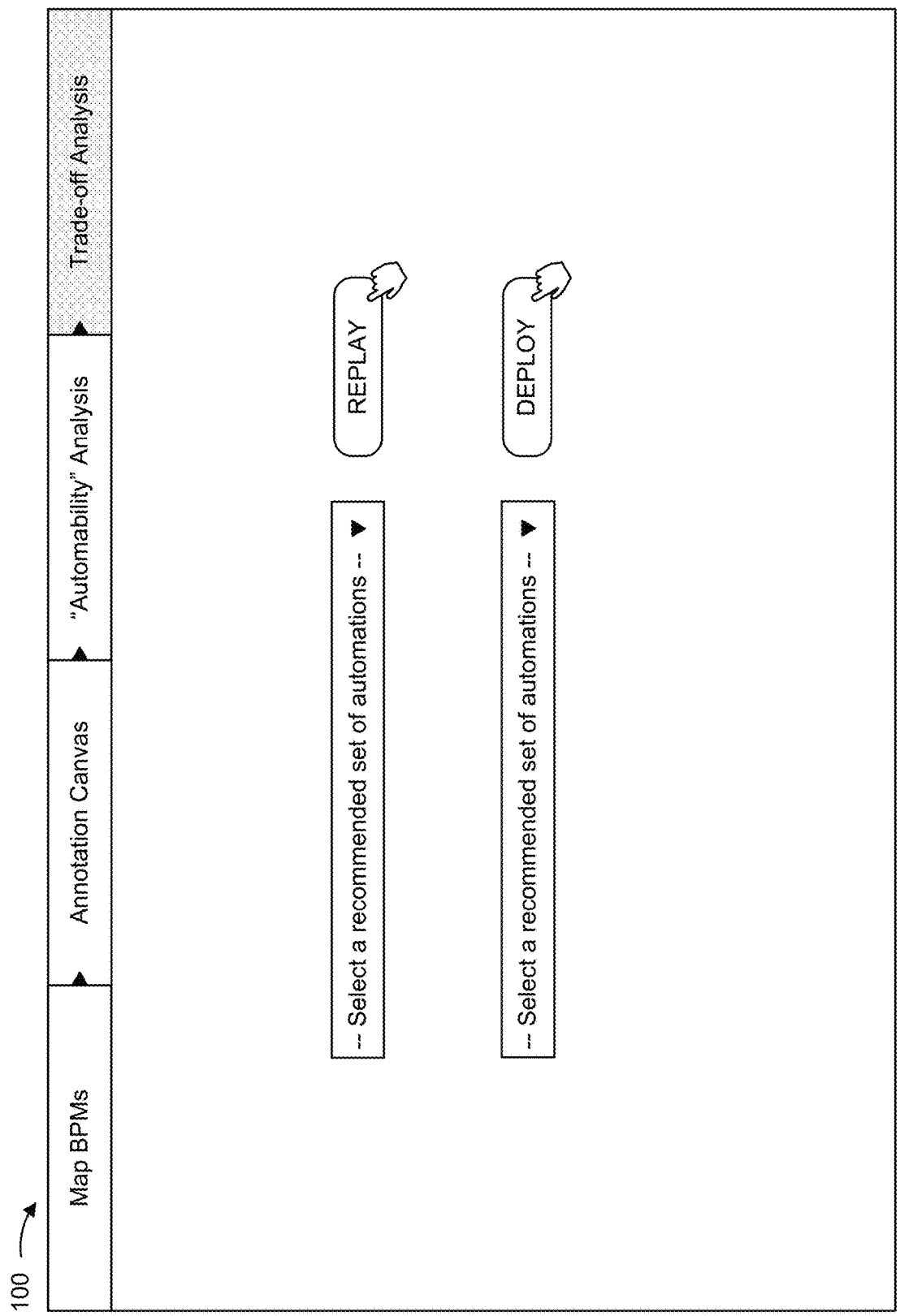

FIG. 1R is a diagram illustrating an example interactive UI that enables a user to review recommended automation services, as described above in connection with FIGS. 1A to 1E. As shown in FIG. 1R, the interactive UI may provide a user-selectable "Replay" option that, when selected by a user, causes an additional interactive UI (e.g., having natural language generation (NLG) functionality) to be displayed (e.g., as a pop-up and/or the like), and information regarding the mapping process, the relevant automation services, the score calculations, and/or the like to be re-presented. In some implementations, the additional interactive UI may permit the user to submit inputs relating to automation service evaluation and recommendation decisions made by the various automation evaluation and recommendation platform components (e.g., to specify "Yes" or "No" for one or more node-based graph mapping decisions made by the mapping component and/or the like).

As further shown in FIG. 1R, the interactive UI may additionally provide a user-selectable "Deploy" option that, when selected by a user, cause an automated report, including pre-requisite information for automation service deployments, estimated time durations for automation service deployments, dependency constraints relating to automation services, and/or the like, to be presented to the user.

FIG. 1S is a diagram illustrating an example portion of a trade-off report (e.g., for one stage of the AS-IS process model), as described above in connection with FIGS. 1A to 1E. The trade-off report may include information regarding each stage of the AS-IS process model relative to the automation service(s) under consideration, including, for example, weightings of the various project factors for each stage of the AS-IS process model, actual cost values relating to the project factors, weighted contributions for each stage of the AS-IS process model based on the weightings and the actual cost values, and ratios of contribution of the project factors for each stage of the AS-IS process model.

In this way, a user can easily identify areas of a business process model that can be improved via automation, and receive recommendations on relevant automation service(s). By automating the identification of gaps between an AS-IS process model and a reference process model, the determination of one or more automation services that address such gaps, the scoring of the automation service(s) based on project factors, and the generation of trade-off reports that provide insight into whether the automation service(s) are likely to be adopted in a current project based on historical data on past automation service adoption decisions in prior project(s), the automation evaluation and recommendation platform ensures that a user is able to select an optimal set of automation service(s) to improve the AS-IS process. Enabling a user to select an optimal set of automation services for a business process, without having to manually evaluate a large repository of available automation services, and mine through large sets of past data on prior automation service-related decisions, conserves computing resources that will otherwise be expended as part of such activities. This also reduces or eliminates the possibility that a user will select an inefficient, or improper, automation service to deploy in a process. Furthermore, leveraging machine learning in the mapping and recommendation process improves the accuracy of model mapping, yields superior automation service recommendations, and conserves processor resources and/or storage resources that may otherwise be used to generate and store rules for model mapping and recommending automation services.

As indicated above, FIGS. 1A-1S are provided merely as examples. Other examples are possible and may differ from what was described with regard to FIGS. 1A-1S.

Figure 2:
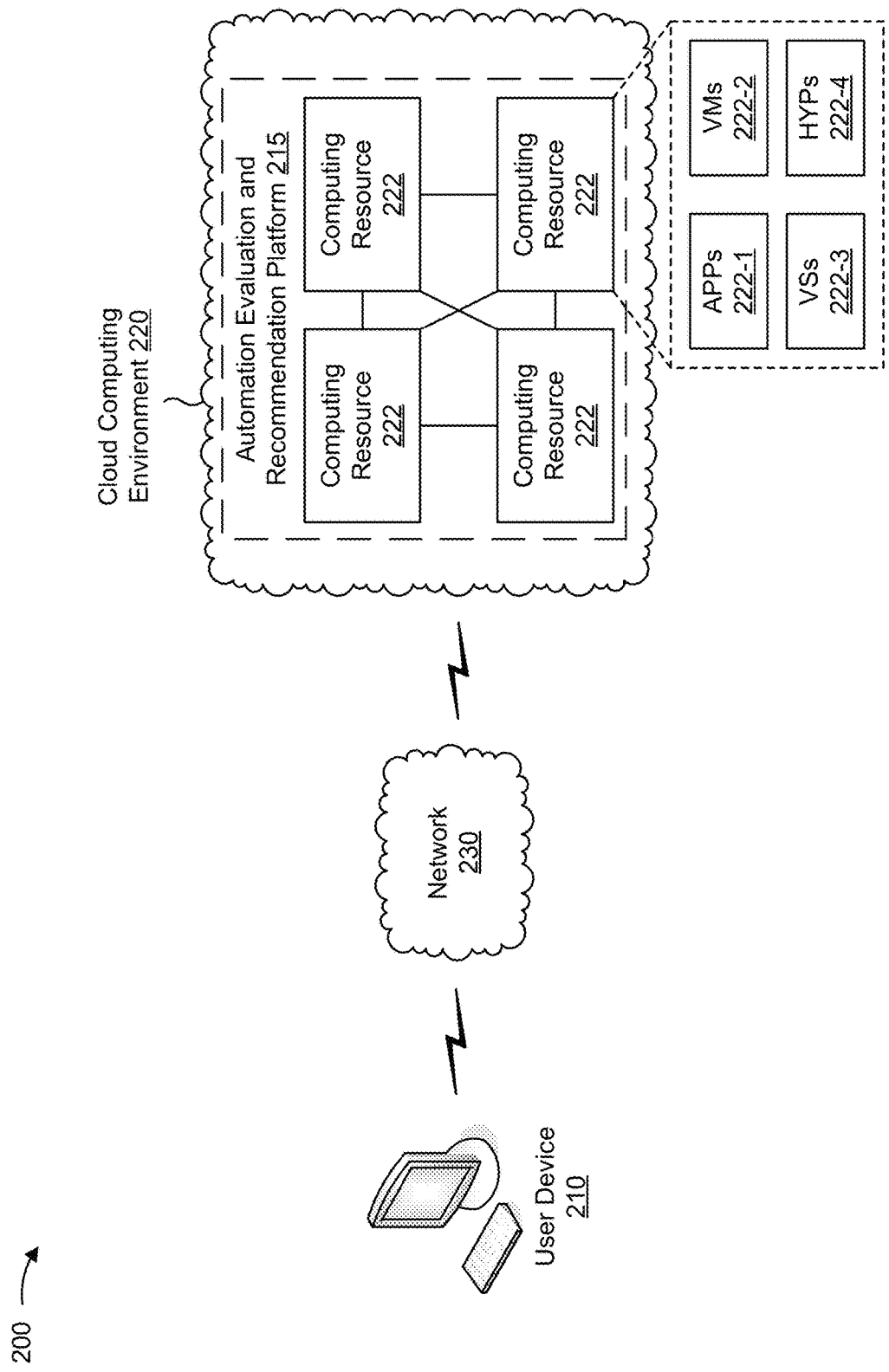
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an automation evaluation and recommendation platform 215 in a cloud computing environment 220 that includes a set of computing resources 222, and a network 230. Devices of environment 200 may interconnect via wired connections, wireless connections, or a combination of wired and wireless connections.

User device 210 includes one or more devices capable of receiving, generating, storing, processing, and/or providing information, associated with mapping of a business process model to a reference process model, and recommendations regarding relevant automation services. For example, user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, user device 210 may include, or communicate, with a user interface that enables a user (e.g., a business owner, a process expert, a subject matter expert, and/or the like) to interact with automation evaluation and recommendation platform 215, as described elsewhere herein.

Automation evaluation and recommendation platform 215 includes one or more devices capable of receiving, generating, storing, processing, and/or providing information, associated with mapping of a business process model to a reference process model, and recommendations regarding relevant automation services. For example, automation evaluation and recommendation platform 215 may include a cloud server or a group of cloud servers. In some implementations, automation evaluation and recommendation platform 215 may be designed to be modular such that certain software components can be swapped in or out depending on a particular need. As such, automation evaluation and recommendation platform 215 may be easily and/or quickly reconfigured for different uses.

In some implementations, as shown, automation evaluation and recommendation platform 215 may be hosted in cloud computing environment 220. Notably, while implementations described herein describe automation evaluation and recommendation platform 215 as being hosted in cloud computing environment 220, in some implementations, automation evaluation and recommendation platform 215 may not be cloud-based (i.e., may be implemented outside of a cloud computing environment) or may be partially cloud-based.

Cloud computing environment 220 includes an environment that hosts automation evaluation and recommendation platform 215. Cloud computing environment 220 may provide computation, software, data access, storage, and/or other services that do not require end-user knowledge of a physical location and configuration of a system and/or a device that hosts automation evaluation and recommendation platform 215. As shown, cloud computing environment 220 may include a group of computing resources 222 (referred to collectively as "computing resources 222" and individually as "computing resource 222").

Computing resource 222 includes one or more personal computers, workstation computers, server devices, or another type of computation and/or communication device. In some implementations, computing resource 222 may host automation evaluation and recommendation platform 215. The cloud resources may include compute instances executing in computing resource 222, storage devices provided in computing resource 222, data transfer devices provided by computing resource 222, etc. In some implementations, computing resource 222 may communicate with other computing resources 222 via wired connections, wireless connections, or a combination of wired and wireless connections.

As further shown in FIG. 2, computing resource 222 may include a group of cloud resources, such as one or more applications ("APPs") 222-1, one or more virtual machines ("VMs") 222-2, one or more virtualized storages ("VSs") 222-3, or one or more hypervisors ("HYPs") 222-4.

Application 222-1 includes one or more software applications that may be provided to or accessed by one or more devices of environment 200. Application 222-1 may eliminate a need to install and execute the software applications on devices of environment 200. For example, application 222-1 may include software associated with automation evaluation and recommendation platform 215 and/or any other software capable of being provided via cloud computing environment 220. In some implementations, one application 222-1 may send/receive information to/from one or more other applications 222-1, via virtual machine 222-2.

Virtual machine 222-2 includes a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system ("OS"). A process virtual machine may execute a single program, and may support a single process. In some implementations, virtual machine 222-2 may execute on behalf of a user (e.g., a user of user device 210), and may manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 222-4 provides hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
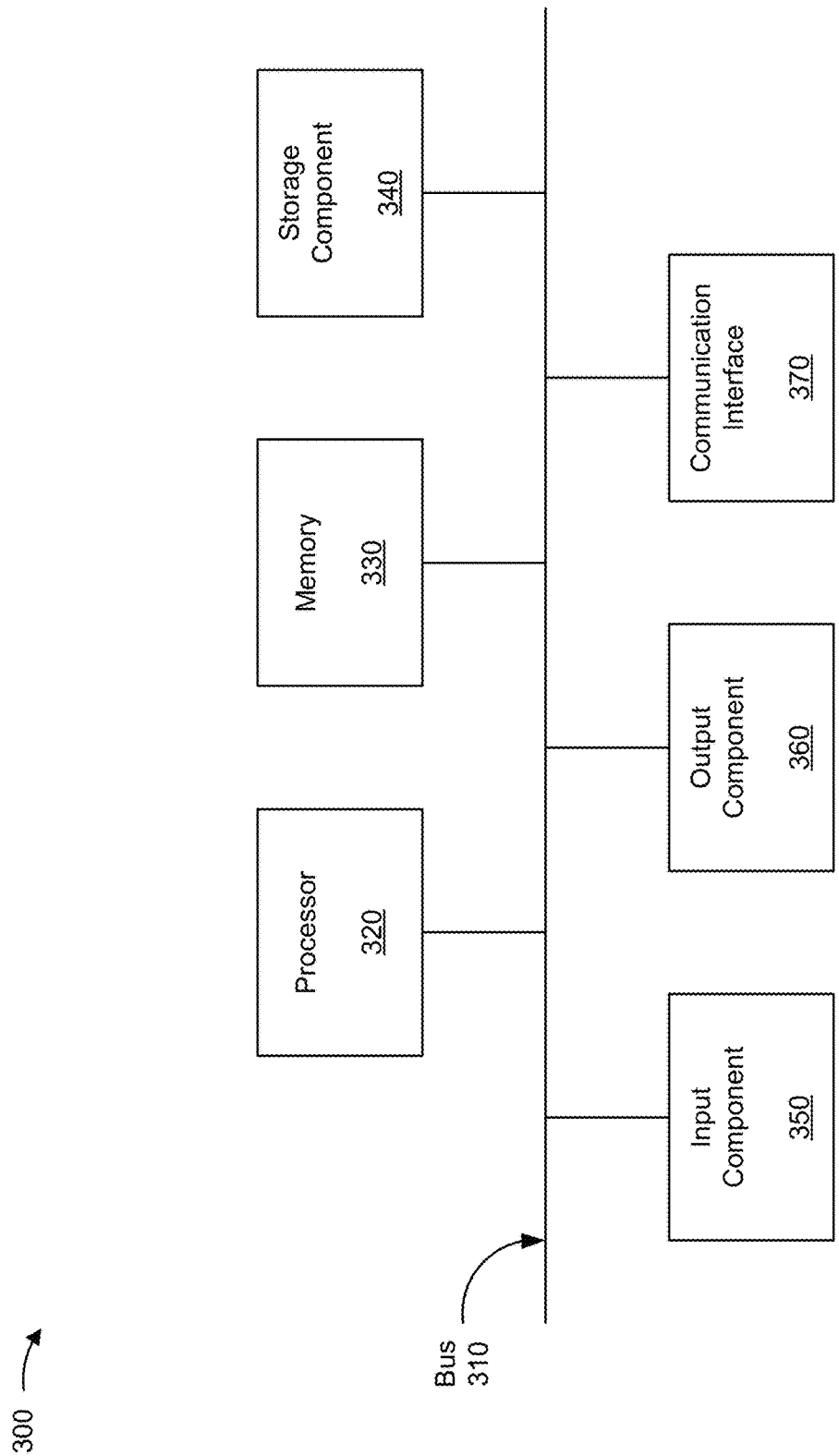
FIG. 3 is a diagram of example components of one or more devices of FIG. 2.

FIG. 3 is a diagram of example components of a device 300. Device 300 may correspond to user device 210, automation evaluation and recommendation platform 215, and/or computing resources 222. In some implementations, user device 210, automation evaluation and recommendation platform 215, and/or computing resources 222 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
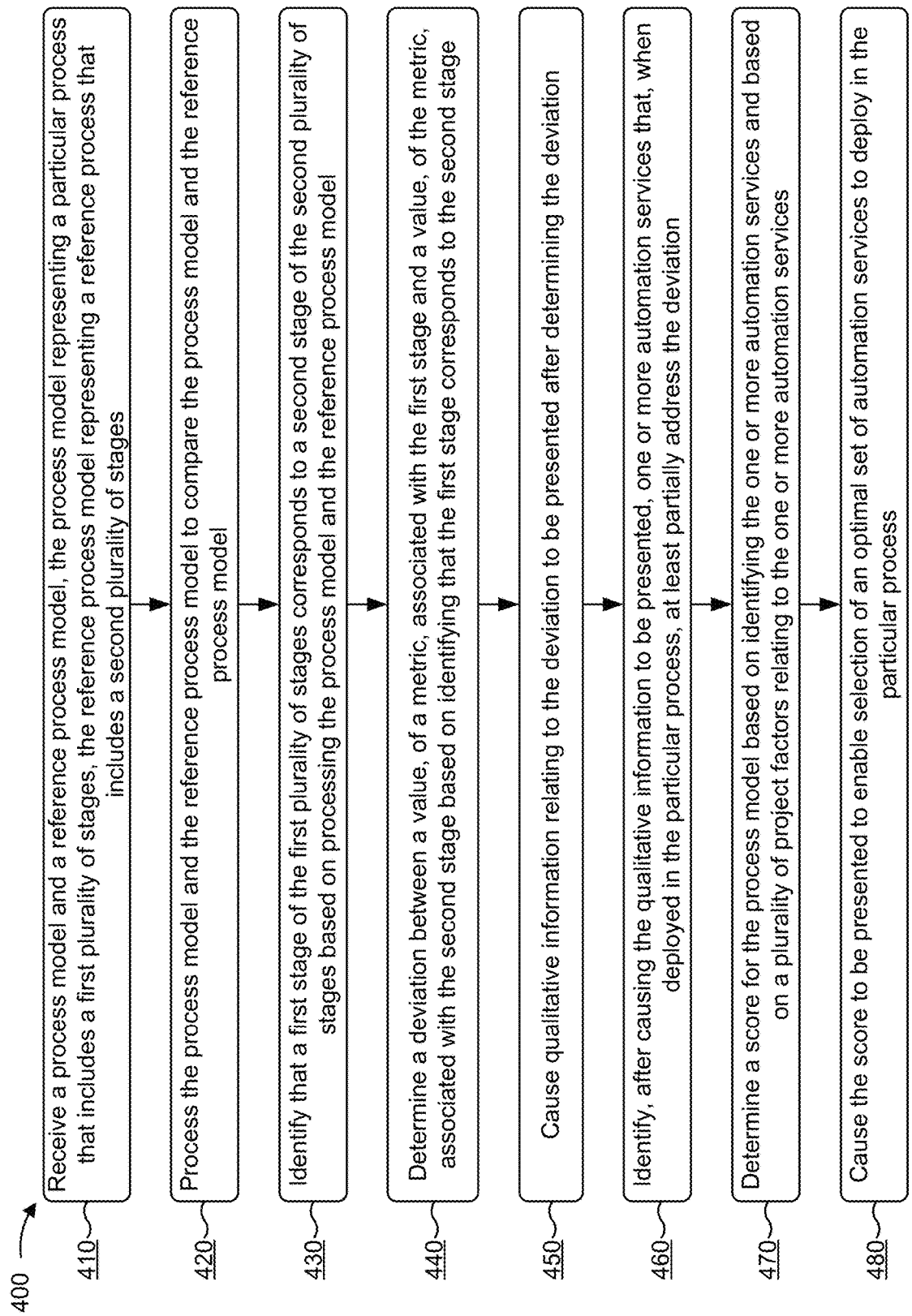
FIG. 4 is a flow chart of an example process for evaluating and recommending automation services for a process.

FIG. 4 is a flow chart of an example process 400 for evaluating and recommending automation services for a process. In some implementations, one or more process blocks of FIG. 4 may be performed by automation evaluation and recommendation platform 215. In some implementations, one or more process blocks of FIG. 4 may be performed by another device or a group of devices separate from or including automation evaluation and recommendation platform 215, such as user device 210 and/or computing resource 222.

As shown in FIG. 4, process 400 may include receiving a process model and a reference process model (block 410). For example, automation evaluation and recommendation platform 215 may (e.g., using computing resource 222, processor 320, memory 330, storage component 340, input component 350, communication interface 370, and/or the like) receive a process model and a reference process model, as described above in connection with FIGS. 1A-1S. In some implementations, the process model may represent a particular process that includes a first plurality of stages. In some implementations, the reference process model may represent a reference process that includes a second plurality of stages.

As further shown in FIG. 4, process 400 may include processing the process model and the reference process model to compare the process model and the reference process model (block 420). For example, automation evaluation and recommendation platform 215 may (e.g., using computing resource 222, processor 320, memory 330, storage component 340, communication interface 370, and/or the like) process the process model and the reference process model to compare the process model and the reference process model, as described above in connection with FIGS. 1A-1S.

As further shown in FIG. 4, process 400 may include identifying that a first stage of the first plurality of stages corresponds to a second stage of the second plurality of stages based on processing the process model and the reference process model (block 430). For example, automation evaluation and recommendation platform 215 may (e.g., using computing resource 222, processor 320, memory 330, storage component 340, communication interface 370, and/or the like) identify that a first stage of the first plurality of stages corresponds to a second stage of the second plurality of stages based on processing the process model and the reference process model, as described above in connection with FIGS. 1A-1S.

As further shown in FIG. 4, process 400 may include determining a deviation between a value, of a metric, associated with the first stage and a value, of the metric, associated with the second stage based on identifying that the first stage corresponds to the second stage (block 440). For example, automation evaluation and recommendation platform 215 may (e.g., using computing resource 222, processor 320, memory 330, storage component 340, communication interface 370, and/or the like) determine a deviation between a value, of a metric, associated with the first stage and a value, of the metric, associated with the second stage based on identifying that the first stage corresponds to the second stage, as described above in connection with FIGS. 1A-1S.

As further shown in FIG. 4, process 400 may include causing qualitative information relating to the deviation to be presented after determining the deviation (block 450). For example, automation evaluation and recommendation platform 215 may (e.g., using computing resource 222, processor 320, memory 330, storage component 340, output component 360, communication interface 370, and/or the like) cause qualitative information relating to the deviation to be presented after determining the deviation, as described above in connection with FIGS. 1A-1S.

As further shown in FIG. 4, process 400 may include identifying, after causing the qualitative information to be presented, one or more automation services that, when deployed in the particular process, at least partially address the deviation (block 460). For example, automation evaluation and recommendation platform 215 may (e.g., using computing resource 222, processor 320, memory 330, storage component 340, communication interface 370, and/or the like) identify, after causing the qualitative information to be presented, one or more automation services that, when deployed in the particular process, at least partially address the deviation, as described above in connection with FIGS. 1A-1S.

As further shown in FIG. 4, process 400 may include determining a score for the process model based on identifying the one or more automation services and based on a plurality of project factors relating to the one or more automation services (block 470). For example, automation evaluation and recommendation platform 215 may (e.g., using computing resource 222, processor 320, memory 330, storage component 340, communication interface 370, and/or the like) determine a score for the process model based on identifying the one or more automation services and based on a plurality of project factors relating to the one or more automation services, as described above in connection with FIGS. 1A-1S.

As further shown in FIG. 4, process 400 may include causing the score to be presented to enable selection of an optimal set of automation services to deploy in the particular process (block 480). For example, automation evaluation and recommendation platform 215 may (e.g., using computing resource 222, processor 320, memory 330, storage component 340, output component 360, communication interface 370, and/or the like) cause the score to be presented to enable selection of an optimal set of automation services to deploy in the particular process, as described above in connection with FIGS. 1A-1S.

Process 400 may include additional implementations, such as any single implementation or any combination of implementations described below and/or in connection with one or more other processes described elsewhere herein.

In some implementations, automation evaluation and recommendation platform 215 may perform a trade-off analysis of the one or more automation services, generate a report based on the trade-off analysis, and cause the report to be presented to further enable selection of the optimal set of automation services to deploy in the particular process. In some implementations, performing the trade-off analysis may include performing the trade-off analysis based on the plurality of project factors and based on historical data relating to automation service adoption by a project associated with the process model. In some implementations, performing the trade-off analysis may include estimating values of the plurality of project factors using a multiple linear regression technique.

In some implementations, the plurality of project factors may be associated with equal weights. In some implementations, automation evaluation and recommendation platform 215 may receive an instruction to adjust a weight associated with a particular project factor of the plurality of project factors, determine an updated score for the process model based on receiving the instruction, and cause the updated score to be presented to further enable selection of the optimal set of automation services to deploy in the particular process.

In some implementations, the plurality of project factors may include a cost per unit if an automation service, of the one or more automation services, is not adopted in the particular process, a cost associated with adoption of the automation service in the particular process, a cost associated with utilization of the automation service in the particular process, or a business-related impact of not adopting the automation service in the particular process.

In some implementations, automation evaluation and recommendation platform 215 may obtain performance information relating to the first stage and the second stage. In some implementations, determining the deviation may include determining the deviation based on obtaining the performance information.

In some implementations, the process model may include a first plurality of nodes corresponding to the first plurality of stages, and the reference process model may include a second plurality of nodes corresponding to the second plurality of stages. In some implementations, processing the process model and the reference process model may include mapping the first plurality of nodes to the second plurality of nodes. In some implementations, processing the process model and the reference process model may include determining a label name of each node of the second plurality of nodes, identifying, for each node of the second plurality of nodes, an equivalent word and/or phrase based on the label name of the node, and comparing the first plurality of nodes and the second plurality of nodes based on the label names and the equivalent words and/or phrases.

In some implementations, processing the process model and the reference process model may include processing the process model and the reference process model using a Cosine similarity analysis technique. In some implementations, the metric may relate to a time needed to perform a task. In some implementations, determining the deviation may include determining that a time needed to perform a task in the first stage is longer than a time needed to perform a task in the second stage.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
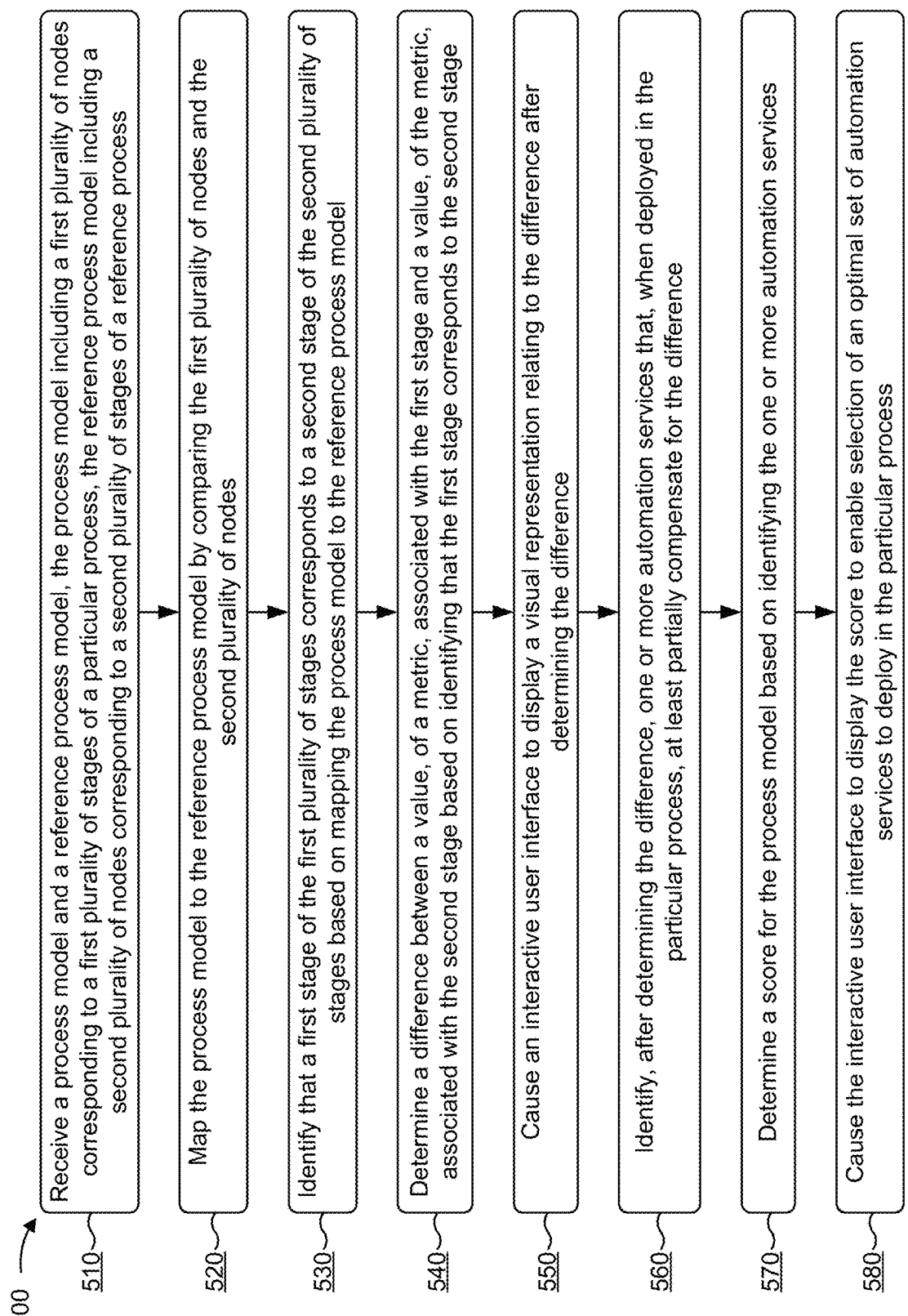
FIG. 5 is a flow chart of an example process for evaluating and recommending automation services for a process.

FIG. 5 is a flow chart of an example process 500 for evaluating and recommending automation services for a process. In some implementations, one or more process blocks of FIG. 5 may be performed by automation evaluation and recommendation platform 215. In some implementations, one or more process blocks of FIG. 5 may be performed by another device or a group of devices separate from or including automation evaluation and recommendation platform 215, such as user device 210 and/or computing resource 222.

As shown in FIG. 5, process 500 may include receiving a process model and a reference process model (block 510). For example, automation evaluation and recommendation platform 215 may (e.g., using computing resource 222, processor 320, memory 330, storage component 340, input component 350, communication interface 370, and/or the like) receive a process model and a reference process model, as described above in connection with FIGS. 1A-1S. In some implementations, the process model may include a first plurality of nodes corresponding to a first plurality of stages of a particular process. In some implementations, the reference process model may include a second plurality of nodes corresponding to a second plurality of stages of a reference process.

As further shown in FIG. 5, process 500 may include mapping the process model to the reference process model by comparing the first plurality of nodes and the second plurality of nodes (block 520). For example, automation evaluation and recommendation platform 215 may (e.g., using computing resource 222, processor 320, memory 330, storage component 340, communication interface 370, and/or the like) map the process model to the reference process model by comparing the first plurality of nodes and the second plurality of nodes, as described above in connection with FIGS. 1A-1S.

As further shown in FIG. 5, process 500 may include identifying that a first stage of the first plurality of stages corresponds to a second stage of the second plurality of stages based on mapping the process model to the reference process model (block 530). For example, automation evaluation and recommendation platform 215 may (e.g., using computing resource 222, processor 320, memory 330, storage component 340, communication interface 370, and/or the like) identify that a first stage of the first plurality of stages corresponds to a second stage of the second plurality of stages based on mapping the process model to the reference process model, as described above in connection with FIGS. 1A-1S.

As further shown in FIG. 5, process 500 may include determining a difference between a value, of a metric, associated with the first stage and a value, of the metric, associated with the second stage based on identifying that the first stage corresponds to the second stage (block 540). For example, automation evaluation and recommendation platform 215 may (e.g., using computing resource 222, processor 320, memory 330, storage component 340, communication interface 370, and/or the like) determine a difference between a value, of a metric, associated with the first stage and a value, of the metric, associated with the second stage based on identifying that the first stage corresponds to the second stage, as described above in connection with FIGS. 1A-1S.

As further shown in FIG. 5, process 500 may include causing an interactive user interface to display a visual representation relating to the difference after determining the difference (block 550). For example, automation evaluation and recommendation platform 215 may (e.g., using computing resource 222, processor 320, memory 330, storage component 340, output component 360, communication interface 370, and/or the like) cause an interactive user interface to display a visual representation relating to the difference after determining the difference, as described above in connection with FIGS. 1A-1S.

As further shown in FIG. 5, process 500 may include identifying, after determining the difference, one or more automation services that, when deployed in the particular process, at least partially compensate for the difference (block 560). For example, automation evaluation and recommendation platform 215 may (e.g., using computing resource 222, processor 320, memory 330, storage component 340, communication interface 370, and/or the like) identify, after determining the difference, one or more automation services that, when deployed in the particular process, at least partially compensate for the difference, as described above in connection with FIGS. 1A-1S.

As further shown in FIG. 5, process 500 may include determining a score for the process model based on identifying the one or more automation services (block 570). For example, automation evaluation and recommendation platform 215 may (e.g., using computing resource 222, processor 320, memory 330, storage component 340, communication interface 370, and/or the like) determine a score for the process model based on identifying the one or more automation services, as described above in connection with FIGS. 1A-1S.

As further shown in FIG. 5, process 500 may include causing the interactive user interface to display the score to enable selection of an optimal set of automation services to deploy in the particular process (block 580). For example, automation evaluation and recommendation platform 215 may (e.g., using computing resource 222, processor 320, memory 330, storage component 340, output component 360, communication interface 370, and/or the like) cause the interactive user interface to display the score to enable selection of an optimal set of automation services to deploy in the particular process, as described above in connection with FIGS. 1A-1S.

Process 500 may include additional implementations, such as any single implementation or any combination of implementations described below and/or in connection with one or more other processes described elsewhere herein.

In some implementations, automation evaluation and recommendation platform 215 may determine that the difference satisfies a threshold. In some implementations, automation evaluation and recommendation platform 215 may cause the interactive user interface to display the visual representation based on determining that the difference satisfies the threshold. In some implementations, automation evaluation and recommendation platform 215 may determine the score further based on one or more cost-related factors relating to the one or more automation services. In some implementations, automation evaluation and recommendation platform 215 may cause the interactive user interface to display a user-selectable option to re-evaluate the score, receive, via the interactive user interface, a selection of the user-selectable option, and re-evaluate the score based on receiving the selection of the user-selectable option.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
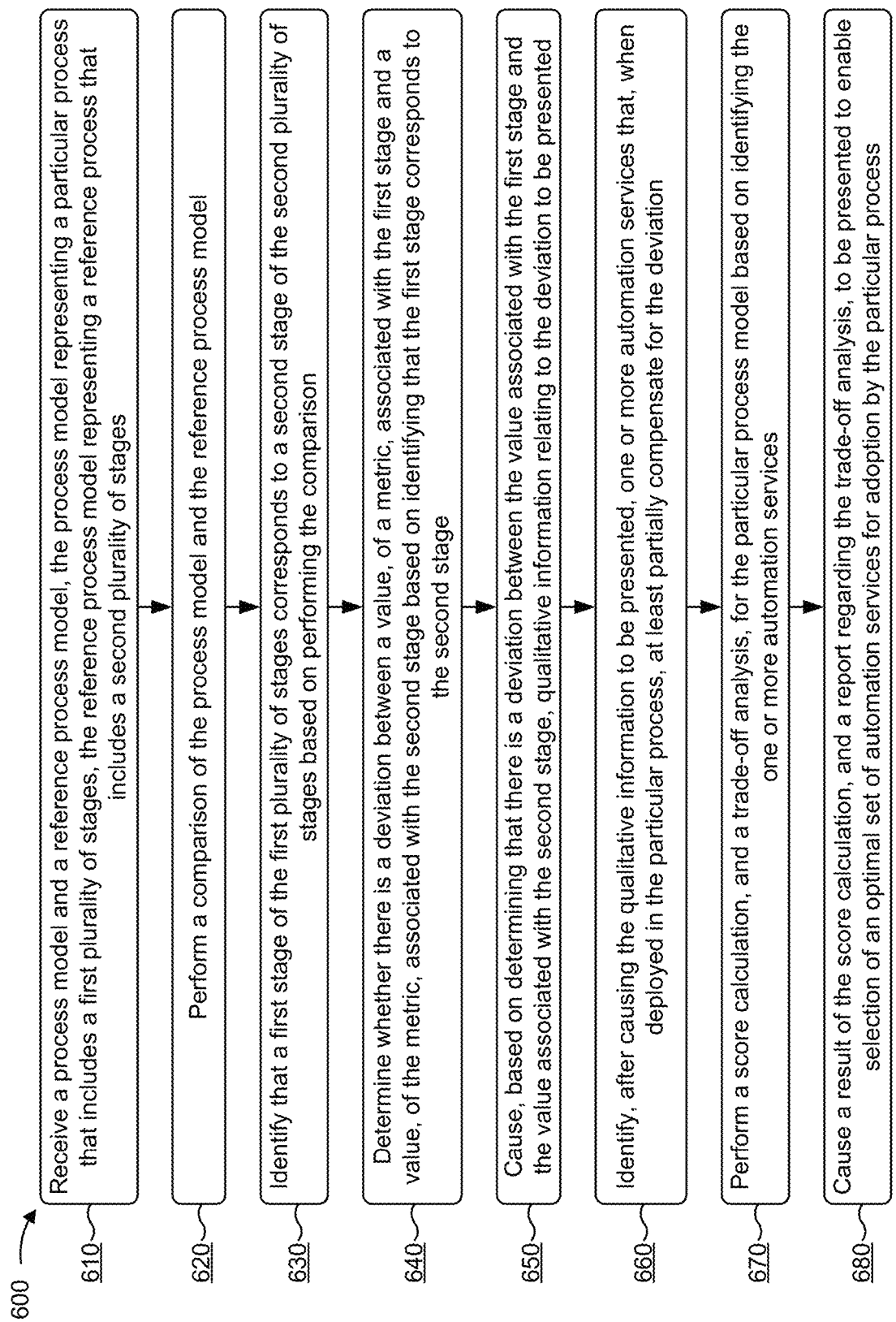
FIG. 6 is a flow chart of an example process for evaluating and recommending automation services for a process.

FIG. 6 is a flow chart of an example process 600 for evaluating and recommending automation services for a process. In some implementations, one or more process blocks of FIG. 6 may be performed by automation evaluation and recommendation platform 215. In some implementations, one or more process blocks of FIG. 6 may be performed by another device or a group of devices separate from or including automation evaluation and recommendation platform 215, such as user device 210 and/or computing resource 222.

As shown in FIG. 6, process 600 may include receiving a process model and a reference process model (block 610). For example, automation evaluation and recommendation platform 215 may (e.g., using computing resource 222, processor 320, memory 330, storage component 340, input component 350, communication interface 370, and/or the like) receive a process model and a reference process model, as described above in connection with FIGS. 1A-1S. In some implementations, the process model may represent a particular process that includes a first plurality of stages. In some implementations, the reference process model may represent a reference process that includes a second plurality of stages.

As further shown in FIG. 6, process 600 may include performing a comparison of the process model and the reference process model (block 620). For example, automation evaluation and recommendation platform 215 may (e.g., using computing resource 222, processor 320, memory 330, storage component 340, communication interface 370, and/or the like) perform a comparison of the process model and the reference process model, as described above in connection with FIGS. 1A-1S.

As further shown in FIG. 6, process 600 may include identifying that a first stage of the first plurality of stages corresponds to a second stage of the second plurality of stages based on performing the comparison (block 630). For example, automation evaluation and recommendation platform 215 may (e.g., using computing resource 222, processor 320, memory 330, storage component 340, communication interface 370, and/or the like) identify that a first stage of the first plurality of stages corresponds to a second stage of the second plurality of stages based on performing the comparison, as described above in connection with FIGS. 1A-1S.

As further shown in FIG. 6, process 600 may include determining whether there is a deviation between a value, of a metric, associated with the first stage and a value, of the metric, associated with the second stage based on identifying that the first stage corresponds to the second stage (block 640). For example, automation evaluation and recommendation platform 215 may (e.g., using computing resource 222, processor 320, memory 330, storage component 340, communication interface 370, and/or the like) determine whether there is a deviation between a value, of a metric, associated with the first stage and a value, of the metric, associated with the second stage based on identifying that the first stage corresponds to the second stage, as described above in connection with FIGS. 1A-1S.

As further shown in FIG. 6, process 600 may include causing, based on determining that there is a deviation between the value associated with the first stage and the value associated with the second stage, qualitative information relating to the deviation to be presented (block 650). For example, automation evaluation and recommendation platform 215 may (e.g., using computing resource 222, processor 320, memory 330, storage component 340, output component 360, communication interface 370, and/or the like) cause, based on determining that there is a deviation between the value associated with the first stage and the value associated with the second stage, qualitative information relating to the deviation to be presented, as described above in connection with FIGS. 1A-1S.

As further shown in FIG. 6, process 600 may include identifying, after causing the qualitative information to be presented, one or more automation services that, when deployed in the particular process, at least partially compensate for the deviation (block 660). For example, automation evaluation and recommendation platform 215 may (e.g., using computing resource 222, processor 320, memory 330, storage component 340, communication interface 370, and/or the like) identify, after causing the qualitative information to be presented, one or more automation services that, when deployed in the particular process, at least partially compensate for the deviation, as described above in connection with FIGS. 1A-1S.

As further shown in FIG. 6, process 600 may include performing a score calculation, and a trade-off analysis, for the process model based on identifying the one or more automation services (block 670). For example, automation evaluation and recommendation platform 215 may (e.g., using computing resource 222, processor 320, memory 330, storage component 340, communication interface 370, and/or the like) perform a score calculation, and a trade-off analysis, for the process model based on identifying the one or more automation services, as described above in connection with FIGS. 1A-1S.

As further shown in FIG. 6, process 600 may include causing a result of the score calculation, and a report regarding the trade-off analysis, to be presented to enable selection of an optimal set of automation services for adoption by the particular process (block 680). For example, automation evaluation and recommendation platform 215 may (e.g., using computing resource 222, processor 320, memory 330, storage component 340, output component 360, communication interface 370, and/or the like) cause a result of the score calculation, and a report regarding the trade-off analysis, to be presented to enable selection of an optimal set of automation services for adoption by the particular process, as described above in connection with FIGS. 1A-1S.

Process 600 may include additional implementations, such as any single implementation or any combination of implementations described below and/or in connection with one or more other processes described elsewhere herein.

In some implementations, the qualitative information may include a recommendation regarding automating the first stage, and an indication of a level of the recommendation. In some implementations, the indication may be represented using a color spectrum. In some implementations, automation evaluation and recommendation platform 215 may identify that multiple stages, of the first plurality of stages, correspond to a single stage of the second plurality of stages, and cause a recommendation, to compress the multiple stages, to be presented. In some implementations, automation evaluation and recommendation platform 215 may identify that a single stage, of the first plurality of stages, corresponds to multiple stages of the second plurality of stages, and cause a recommendation, to expand the single stage, to be presented.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations, described herein, provide an automation evaluation and recommendation platform 215 (e.g., an engine or a device) that is capable of mapping a business process model (e.g., an AS-IS process model) to a reference process model (e.g., an industry standard model, such as a gold standard model, associated with various KPI metrics), and determining, based on the mapping, inefficiencies (e.g., gaps or deviations) in the business process model that might be addressed via automation. In some implementations, automation evaluation and recommendation platform 215 is capable of automatically providing qualitative information that identifies (e.g., visually, such as via a color spectrum) how closely various stages of the business process model meet the reference process model (e.g., the KPI metrics), and identifying one or more relevant automation services that might address the inefficiencies. In some implementations, automation evaluation and recommendation platform 215 is capable of calculating initial score(s) for the business process model, that provide a quantitative measure of the business process model relative to the reference process model, based on information regarding the automation service(s) under consideration, and based on the effects that such automation service(s) may have on certain factors for a current project (e.g., project factors, such as cost-related factors). In some implementations, automation evaluation and recommendation platform 215 is capable of providing the initial score(s), and recommendations regarding the automation service(s), to a user (e.g., a business owner, a subject matter expert, and/or the like) for review, permitting the user to adjust weightings of the project factors as needed, and re-evaluating the score(s) based on the adjusted weightings. Further, in some implementations, automation evaluation and recommendation platform 215 is capable of performing a trade-off analysis of the automation service(s) based on historical data regarding past automation service adoption decisions in prior projects, and generating and providing recommendations on whether the current project is likely to adopt the automation service(s) based on the trade-off analysis. Furthermore, in some implementations, automation evaluation and recommendation platform 215 is capable of leveraging machine learning techniques, including similarity analysis and/or classification techniques, in various portions of the mapping and recommendation process.

In this way, a user can easily identify areas of a business process model that can be improved via automation, and receive recommendations on relevant automation service(s). By automating the identification of gaps between an AS-IS process model and a reference process model, the determination of one or more automation services that address such gaps, the scoring of the automation service(s) based on project factors, and the generation of trade-off reports that provide insight into whether the automation service(s) are likely to be adopted in a current project based on historical data on past automation service adoption decisions in prior project(s), the automation evaluation and recommendation platform ensures that a user is able to select an optimal set of automation service(s) to improve the AS-IS process. Enabling a user to select an optimal set of automation services for a business process, without having to manually evaluate a large repository of available automation services, and mine through large sets of past data on prior automation service-related decisions, conserves computing resources that will otherwise be expended as part of such activities. This also reduces or eliminates the possibility that a user will select an inefficient, or improper, automation service to deploy in a process. Furthermore, leveraging machine learning in the mapping and recommendation process improves the accuracy of model mapping, yields superior automation service recommendations, and conserves processor resources and/or storage resources that may otherwise be used to generate and store rules for model mapping and recommending automation services.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Certain user interfaces have been described herein and/or shown in the figures. A user interface can include a graphical user interface, a non-graphical user interface, a text-based user interface, and/or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:
1. A method, comprising:
receiving, by a device, a process model and a reference process model,
the process model representing a particular process that includes a first plurality of stages,
the reference process model representing a reference process that includes a second plurality of stages;
processing, by the device, the process model and the reference process model to compare the process model and the reference process model, the process model and the reference process model being compared utilizing an automated graph similarity matching technique;

identifying, by the device, that a first stage of the first plurality of stages corresponds to a second stage of the second plurality of stages based on processing the process model and the reference process model;

determining, by the device, a deviation between a value, of a metric, associated with the first stage and a value, of the metric, associated with the second stage based on identifying that the first stage corresponds to the second stage;

automatically causing, by the device, an interactive user interface to display qualitative information relating to the deviation after determining the deviation;

identifying, by the device, and after automatically causing the interactive user interface to display the qualitative information, one or more automation services that, when deployed in the particular process, at least partially address the deviation;

determining, by the device, a score for the process model based on identifying the one or more automation services and based on a plurality of project factors relating to the one or more automation services;

causing, by the device, the interactive user interface to display a user-selectable option to re-evaluate the score based on the score meeting a threshold value, wherein the user-selectable option permits adjustments to be made to weightings associated with the plurality of project factors;

determining, by the device and utilizing a logistic regression classification machine learning technique, whether the one or more automation services are likely to be adopted based on the score, the logistic regression classification machine learning technique using historical data relating to the plurality of project factors and corresponding decisions to adopt;

selectively, based on determining whether the one or more automation services are likely to be adopted:

displaying, via the interactive user interface, a first notification indicating that adoption of the automation service is not advised based on determining that a value associated with whether the one or more automation services are likely to be adopted satisfies a threshold, and displaying, via the interactive user interface, a second notification indicating that adoption of the automation service is advised, based on determining the value associated with whether the one or more automation services are likely to be adopted does not satisfy the threshold; and causing, by the device and based on selectively displaying the first notification or the second notification, the score to be presented to enable selection of an optimal set of automation services to deploy in the particular process.

2. The method of claim 1, further comprising:
performing a trade-off analysis of the one or more automation services;
generating a report based on the trade-off analysis; and
causing the report to be presented to further enable selection of the optimal set of automation services to deploy in the particular process.

3. The method of claim 2, wherein performing the trade-off analysis comprises:
performing the trade-off analysis based on the plurality of project factors and based on historical data relating to automation service adoption by a project associated with the process model.

4. The method of claim 1, wherein the plurality of project factors are associated with equal weights; and
wherein the method further comprises:
receiving an instruction to adjust a weight associated with a particular project factor of the plurality of project factors;
determining an updated score for the process model based on receiving the instruction; and
causing the updated score to be presented to further enable selection of the optimal set of automation services to deploy in the particular process.

5. The method of claim 1, wherein the plurality of project factors includes:
a cost per unit if an automation service, of the one or more automation services, is not adopted in the particular process,
a cost associated with adoption of the automation service in the particular process,
a cost associated with utilization of the automation service in the particular process, or
a business-related impact of not adopting the automation service in the particular process.

6. The method of claim 1, further comprising:
obtaining performance information relating to the first stage and the second stage; and
wherein determining the deviation comprises:
determining the deviation based on obtaining the performance information.

7. The method of claim 1, wherein the process model includes a first plurality of nodes corresponding to the first plurality of stages, and the reference process model includes a second plurality of nodes corresponding to the second plurality of stages; and
wherein processing the process model and the reference process model comprises:
mapping the first plurality of nodes to the second plurality of nodes.

8. The method of claim 1, wherein the process model includes a first plurality of nodes corresponding to the first plurality of stages, and the reference process model includes a second plurality of nodes corresponding to the second plurality of stages; and
wherein processing the process model and the reference process model comprises:
determining a label name of each node of the second plurality of nodes;
identifying, for each node of the second plurality of nodes, an equivalent word and/or phrase based on the label name of the node; and
comparing the first plurality of nodes and the second plurality of nodes based on the label name of each node and corresponding equivalent words and/or phrases.

9. The method of claim 1, wherein processing the process model and the reference process model comprises:
processing the process model and the reference process model using a Cosine similarity analysis technique.

10. The method of claim 1, wherein the metric relates to a time needed to perform a task; and
wherein determining the deviation comprises:
determining that a time needed to perform a task in the first stage is longer than a time needed to perform a task in the second stage.

11. A device, comprising:
one or more memories; and
one or more processors, coupled to the one or more memories, to:
receive a process model and a reference process model,
the process model including a first plurality of nodes corresponding to a first plurality of stages of a particular process,
the reference process model including a second plurality of nodes corresponding to a second plurality of stages of a reference process;
map the process model to the reference process model by comparing the first plurality of nodes and the second plurality of nodes utilizing an automated graph similarity matching technique;
identify that a first stage of the first plurality of stages corresponds to a second stage of the second plurality of stages based on mapping the process model to the reference process model;
determine a difference between a value, of a metric, associated with the first stage and a value, of the metric, associated with the second stage based on identifying that the first stage corresponds to the second stage;
cause an interactive user interface to display a visual representation relating to the difference after determining the difference;
identify, after determining the difference, one or more automation services that, when deployed in the particular process, at least partially compensate for the difference;
determine a score for the process model based on identifying the one or more automation services;
cause the interactive user interface to display a user-selectable option to re-evaluate the score based on the score meeting a threshold value,
wherein the user-selectable option permits adjustments to be made to weightings associated with one or more project factors of a plurality of project factors;
determine, utilizing a logistic regression classification machine learning technique, whether the one or more automation services are likely to be adopted based on the score,
the logistic regression classification machine learning technique using historical data relating to the plurality of project factors and corresponding decisions to adopt;
selectively, based on determining whether the one or more automation services are likely to be adopted:
display, via the interactive user interface, a first notification indicating that adoption of the automation service is not advised based on determining that a value associated with whether the one or more automation services are likely to be adopted satisfies a threshold, and
display, via the interactive user interface, a second notification indicating that adoption of the automation service is advised, based on determining the value associated with whether the one or more automation services are likely to be adopted does not satisfy the threshold; and
cause, based on selectively displaying the first notification or the second notification, the interactive user interface to display the score to enable selection of an optimal set of automation services to deploy in the particular process.

12. The device of claim 11, wherein the one or more processors, when determining the difference, are to:
determine that the difference satisfies a threshold; and
wherein the one or more processors, when causing the interactive user interface to display the visual representation, are to:
cause the interactive user interface to display the visual representation based on determining that the difference satisfies the threshold.

13. The device of claim 11, wherein the one or more processors, when determining the score, are to:
determine the score further based on one or more cost-related factors relating to the one or more automation services.

14. The device of claim 11, wherein the one or more processors are further to:
receive, via the interactive user interface, a selection of the user-selectable option; and
re-evaluate the score based on receiving the selection of the user-selectable option.

15. A non-transitory computer-readable medium storing instructions, the instructions comprising:
one or more instructions that, when executed by one or more processors, cause the one or more processors to:
receive a process model and a reference process model,
the process model representing a particular process that includes a first plurality of stages,
the reference process model representing a reference process that includes a second plurality of stages;
perform a comparison of the process model and the reference process model utilizing an automated graph similarity matching technique;
identify that a first stage of the first plurality of stages corresponds to a second stage of the second plurality of stages based on performing the comparison;
determine whether there is a deviation between a value, of a metric, associated with the first stage and a value, of the metric, associated with the second stage based on identifying that the first stage corresponds to the second stage;
cause, based on determining that there is a deviation between the value associated with the first stage and the value associated with the second stage, qualitative information relating to the deviation to be presented;
identify, after causing the qualitative information to be presented, one or more automation services that, when deployed in the particular process, at least partially compensate for the deviation;
perform a score calculation, and a trade-off analysis, for the process model based on identifying the one or more automation services;
cause an interactive user interface to display a user-selectable option to re-evaluate the score calculation based on the score calculation meeting a threshold value,
wherein the user-selectable option permits adjustments to be made to weighting associated with one or more project factors of a plurality of project factors;

determine, utilizing a logistic regression classification machine learning technique, whether the one or more automation services are likely to be adopted based on the score calculation, the logistic regression classification machine learning technique using historical data relating to the plurality of project factors and corresponding decisions to adopt;

selectively, based on determining whether the one or more automation services are likely to be adopted:

display, via the interactive user interface, a first notification indicating that adoption of the automation service is not advised based on determining that a value associated with whether the one or more automation services are likely to be adopted satisfies a threshold, and display, via the interactive user interface, a second notification indicating that adoption of the automation service is advised, based on determining the value associated with whether the one or more automation services are likely to be adopted does not satisfy the threshold; and cause, based on selectively displaying the first notification or the second notification, a result of the score calculation, and a report regarding the trade-off analysis, to be presented to enable selection of an optimal set of automation services for adoption by the particular process.

16. The non-transitory computer-readable medium of claim 15, wherein the qualitative information includes a recommendation regarding automating the first stage, and an indication of a level of the recommendation.

17. The non-transitory computer-readable medium of claim 16, wherein the indication is represented using a color spectrum.

18. The non-transitory computer-readable medium of claim 15, wherein the one or more instructions, when executed by the one or more processors, further cause the one or more processors to:

identify that multiple stages, of the first plurality of stages, correspond to a single stage of the second plurality of stages; and cause a recommendation, to compress the multiple stages, to be presented.

19. The non-transitory computer-readable medium of claim 15, wherein the one or more instructions, when executed by the one or more processors, further cause the one or more processors to:

identify that a single stage, of the first plurality of stages, corresponds to multiple stages of the second plurality of stages; and cause a recommendation, to expand the single stage, to be presented.

20. The device of claim 11, wherein the one or more processors, when determining the score for the process model, are to:

determine the score for the process model based on the plurality of project factors relating to the one or more automation services; and wherein the one or more processors are further to:

cause the interactive user interface to display a notification regarding the weightings associated with the one or more project factors; and enable adjustments of the weights of the one or more project factors via adjustable sliders of the interactive user interface.

* * * * *